Oct. 16, 1928.
J. T. DALTON
1,688,268
BAG MAKING AND FILLING MACHINE
Filed Aug. 19, 1927    20 Sheets-Sheet 5
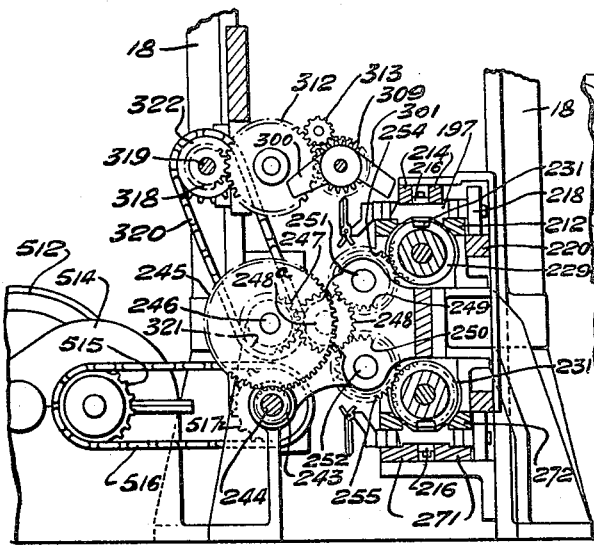
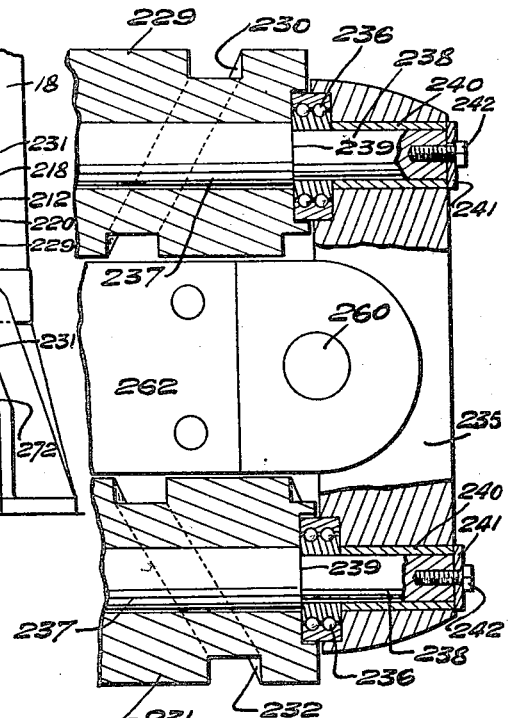
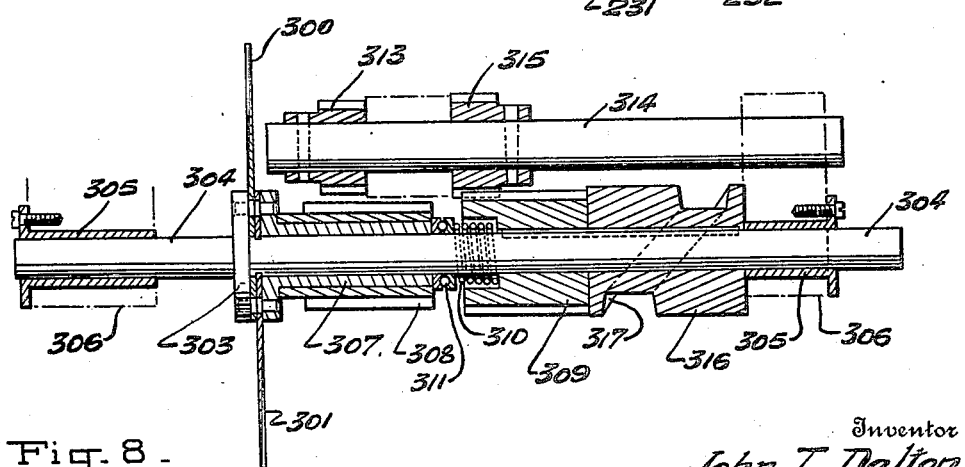
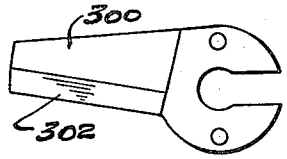
Inventor
John T. Dalton
By
Attorney

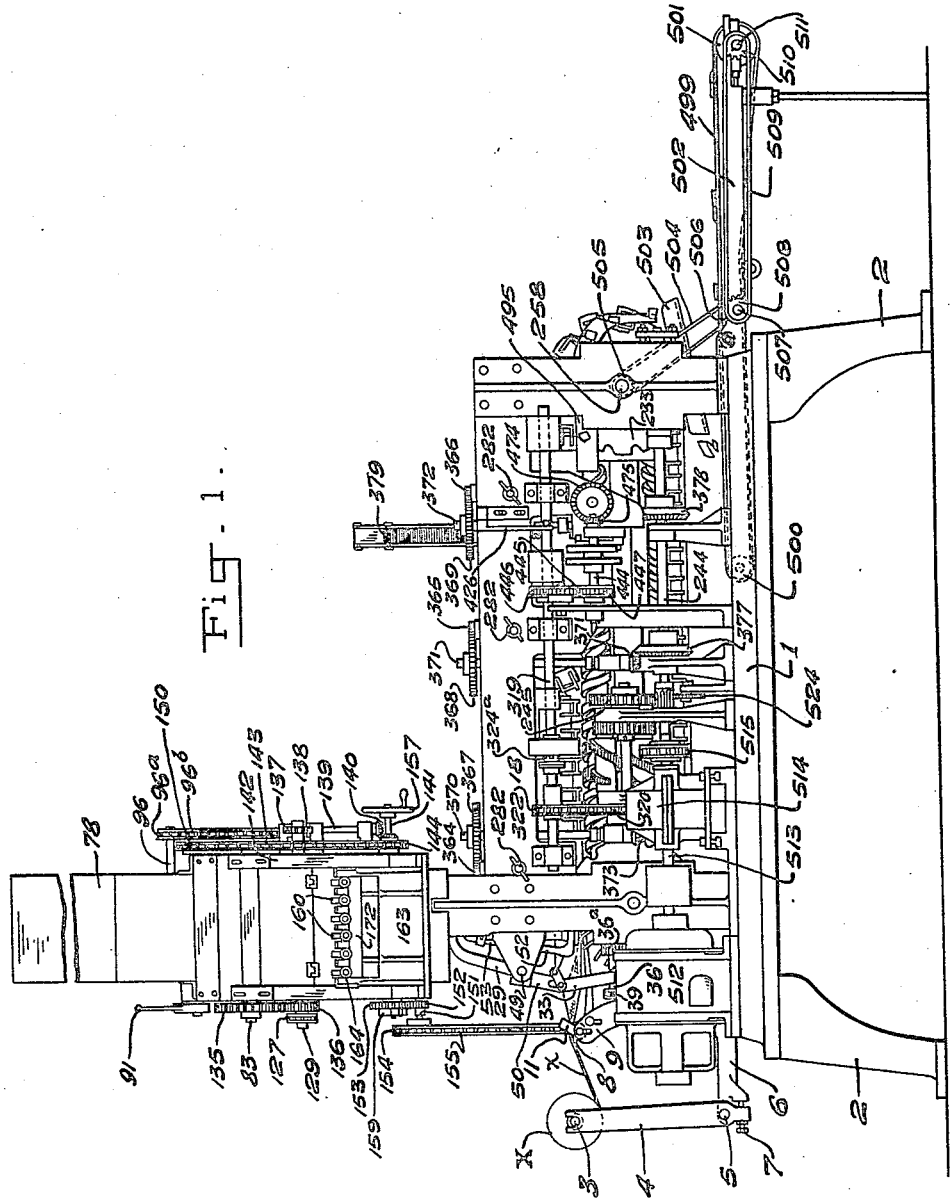

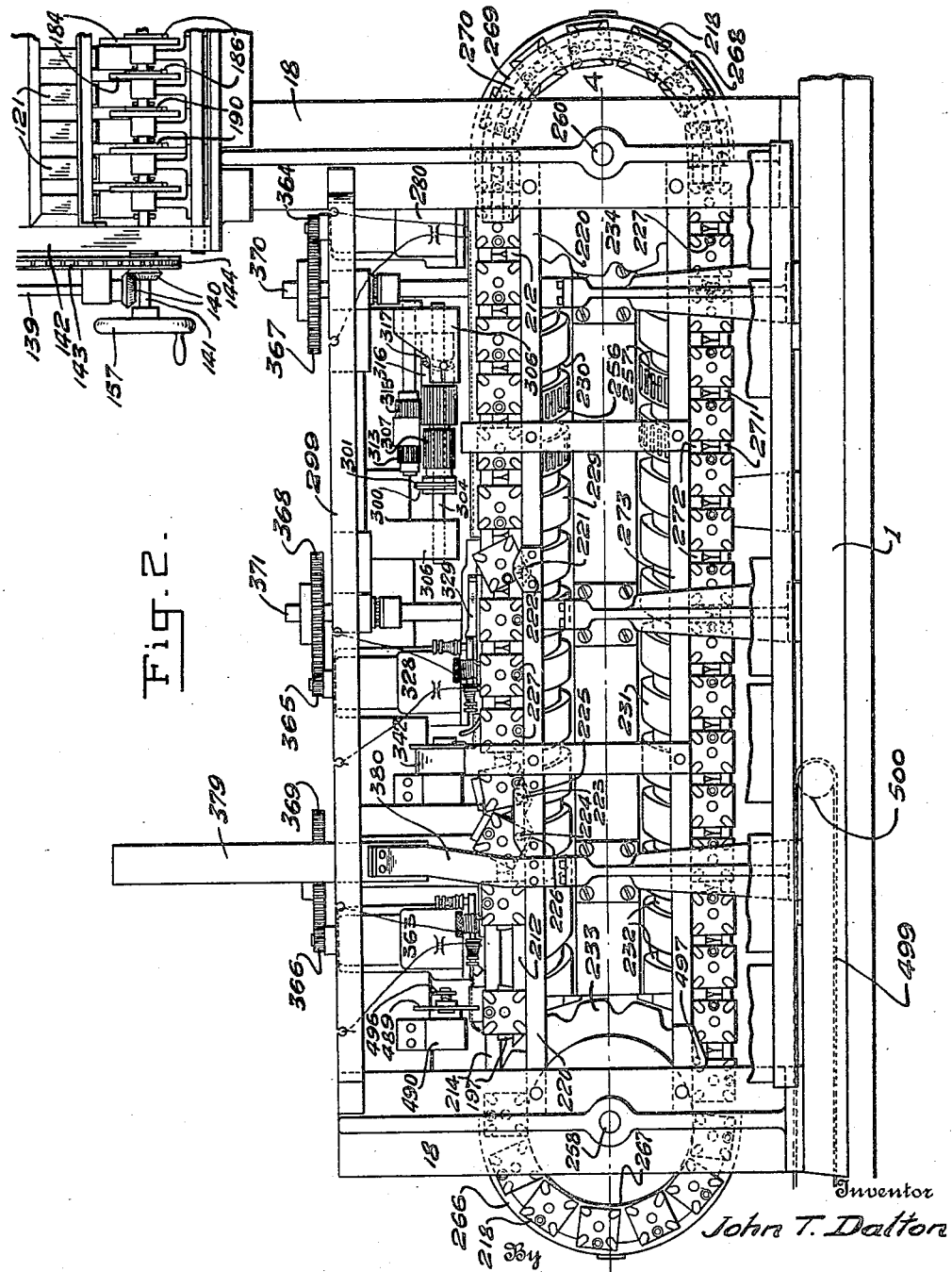

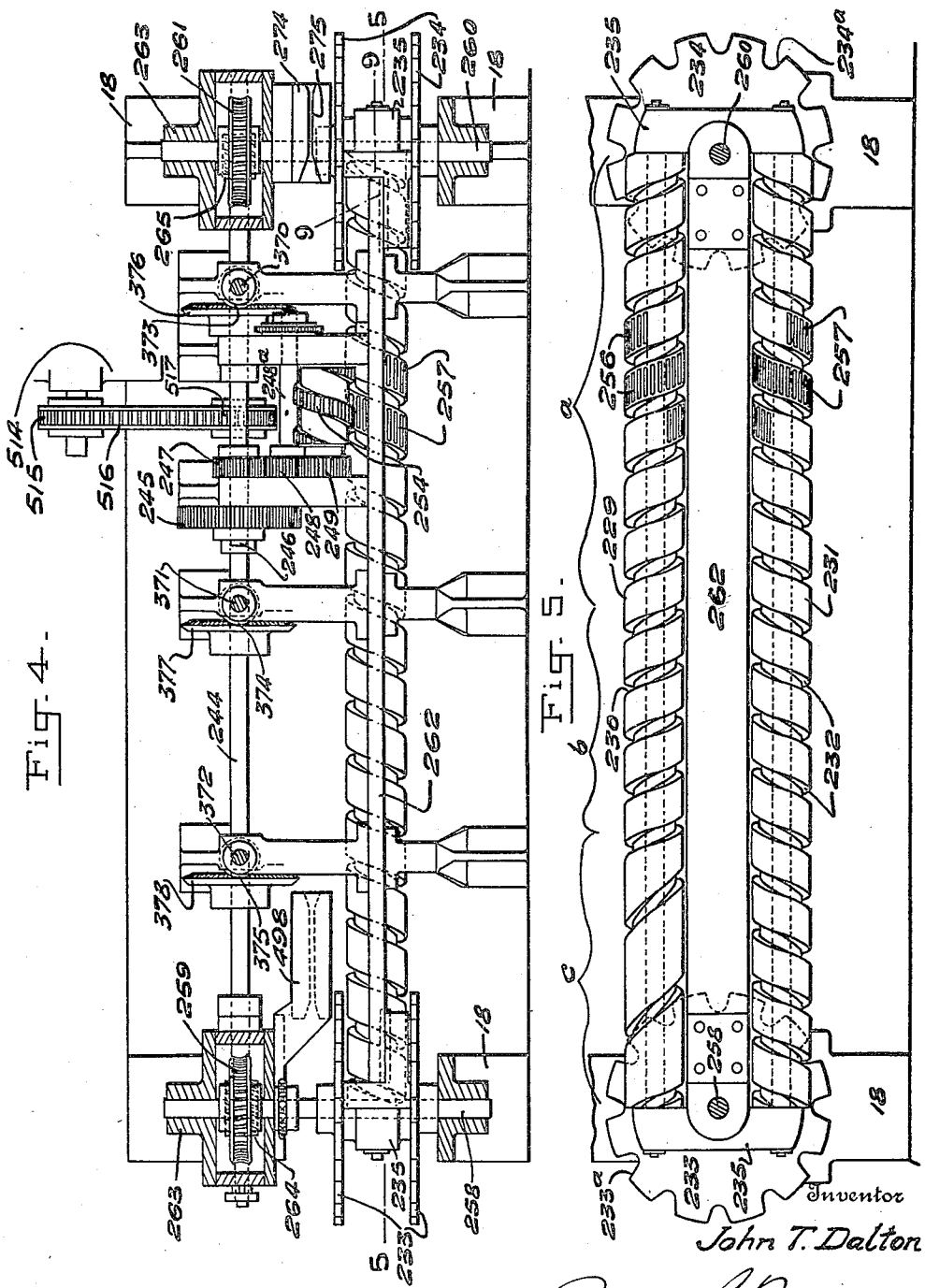

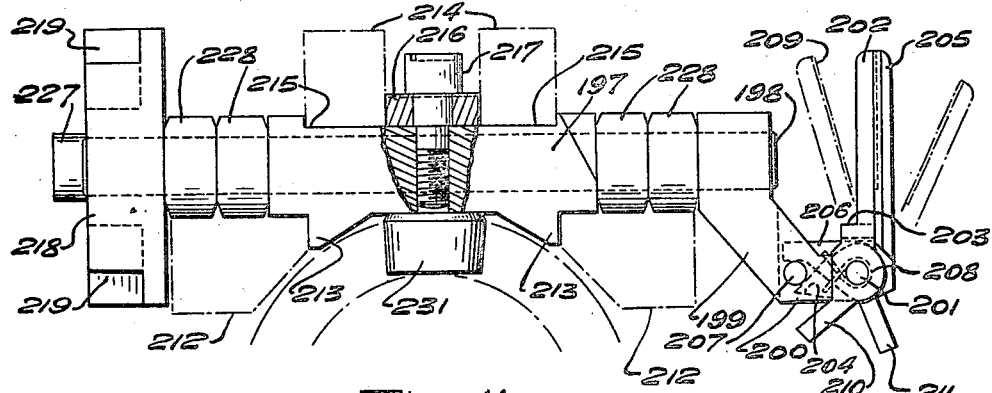
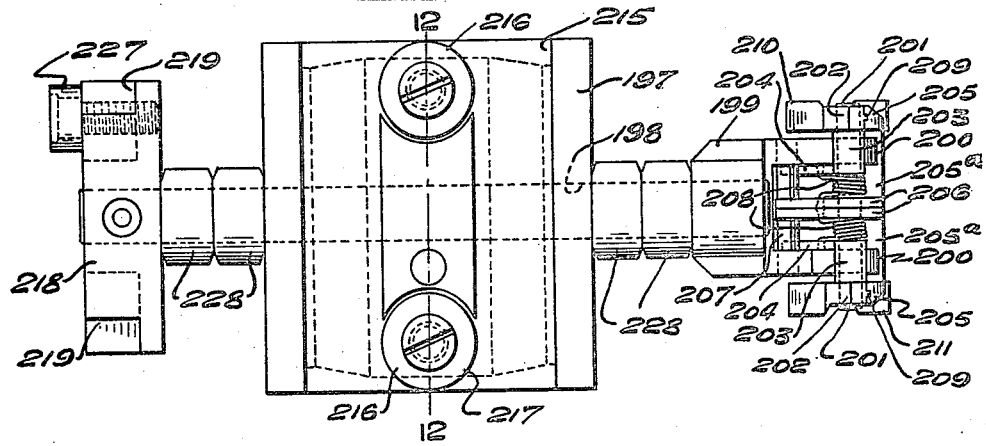
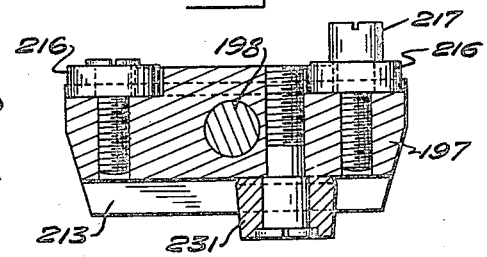
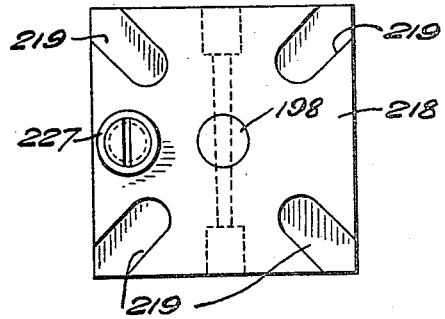

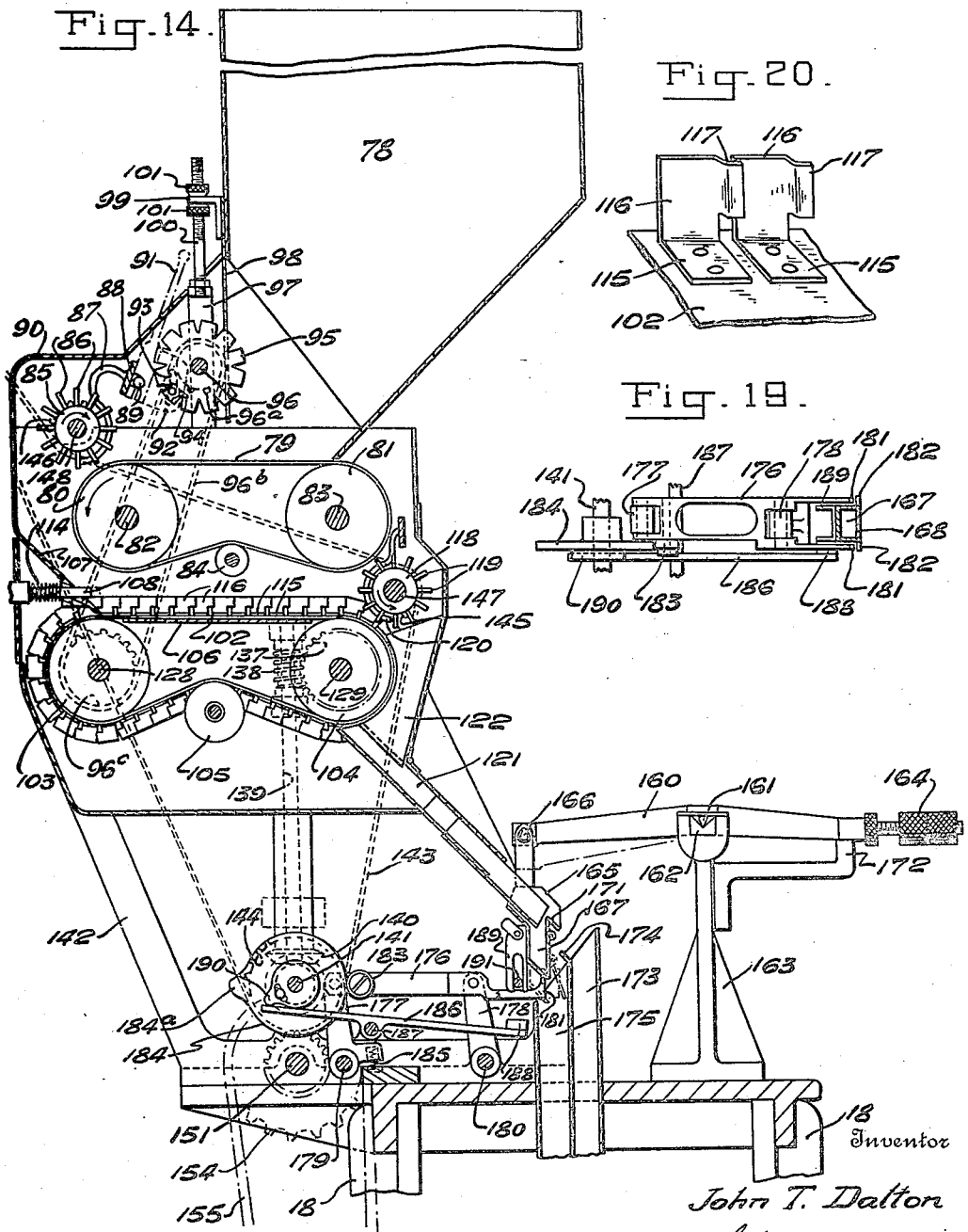

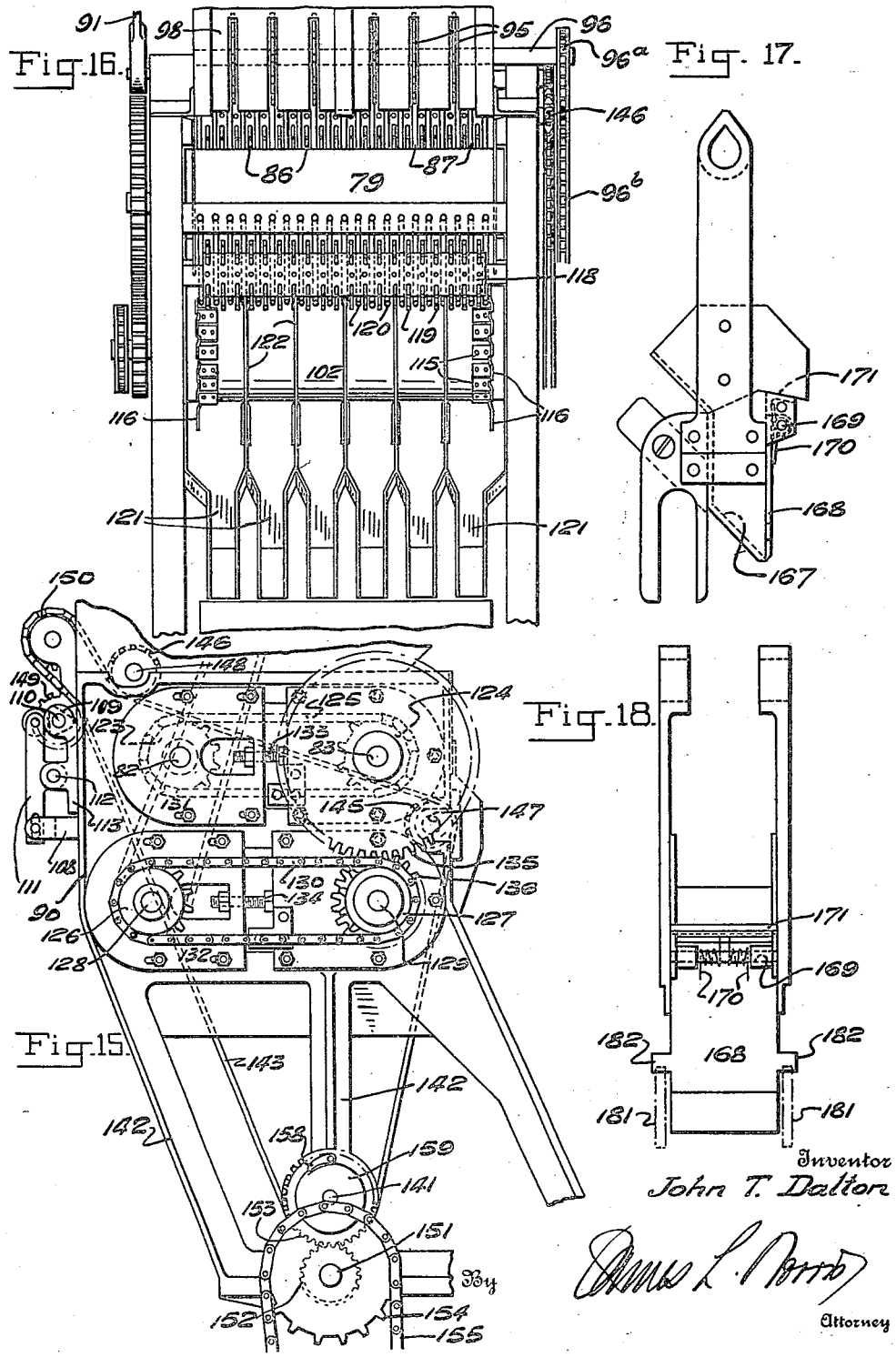

Oct. 16, 1928.  
J. T. DALTON  
1,688,268  
BAG MAKING AND FILLING MACHINE  
Filed Aug. 19, 1927   20 Sheets-Sheet 9
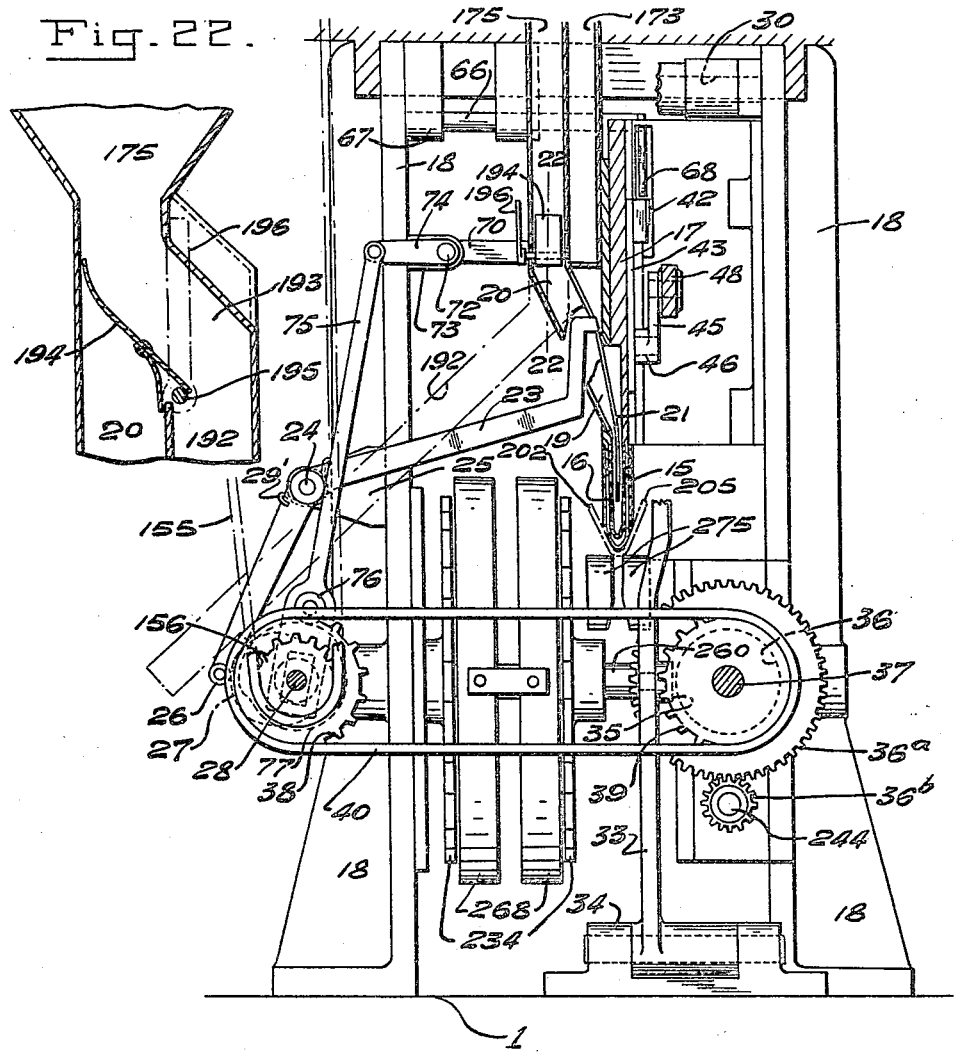
Inventor  
John T. Dalton  
By  
Attorney Oct. 16, 1928.
J. T. DALTON
BAG MAKING AND FILLING MACHINE
Filed Aug. 19, 1927
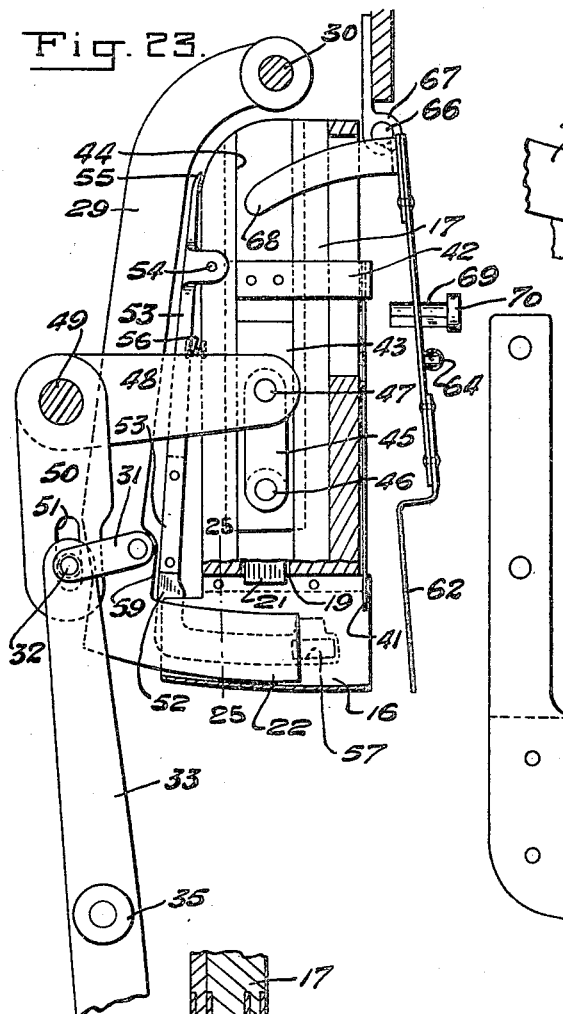
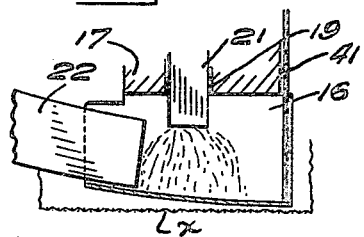
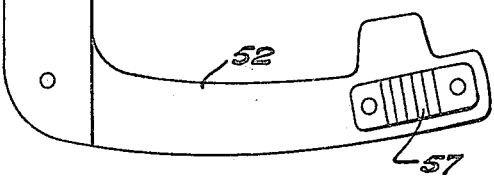
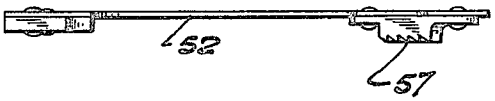
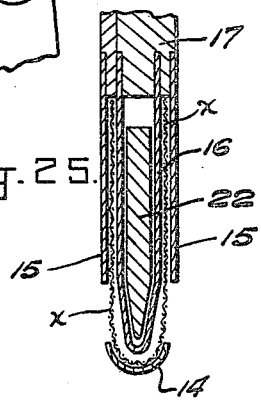
Inventor
John T. Dalton

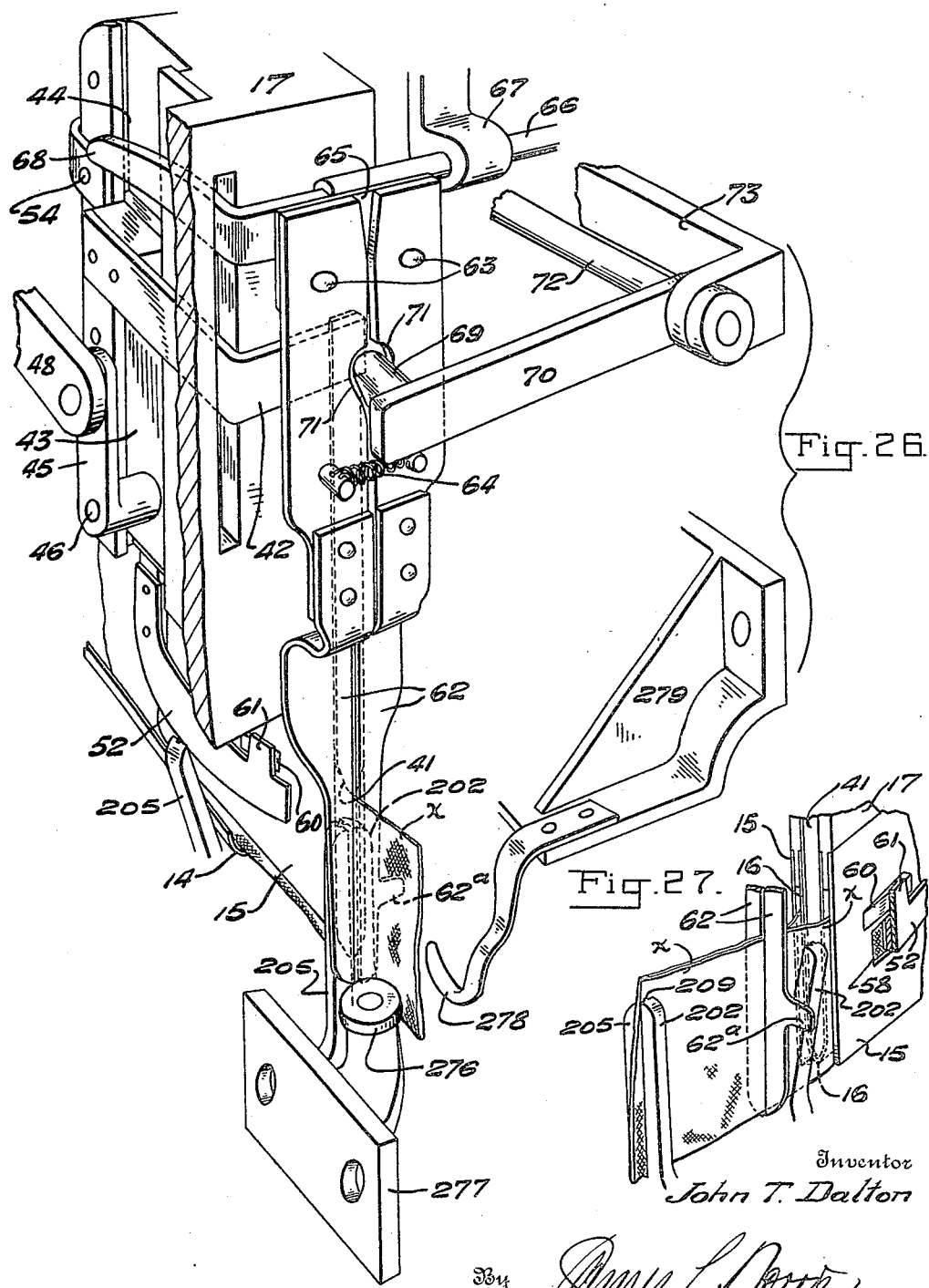

Oct. 16, 1928.
J. T. DALTON
1,688,268
BAG MAKING AND FILLING MACHINE
Filed Aug. 19, 1927   20 Sheets-Sheet 12
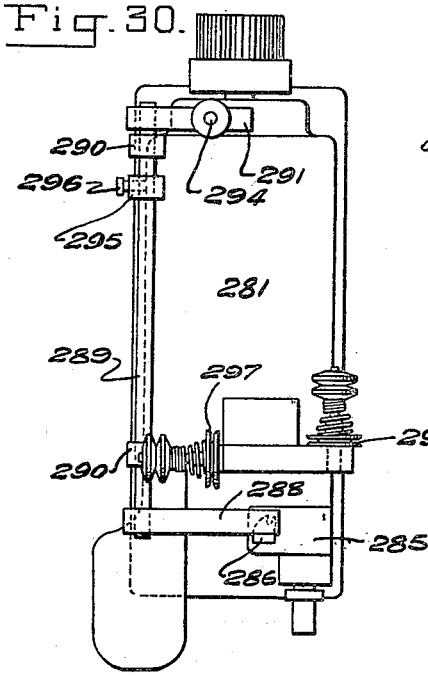
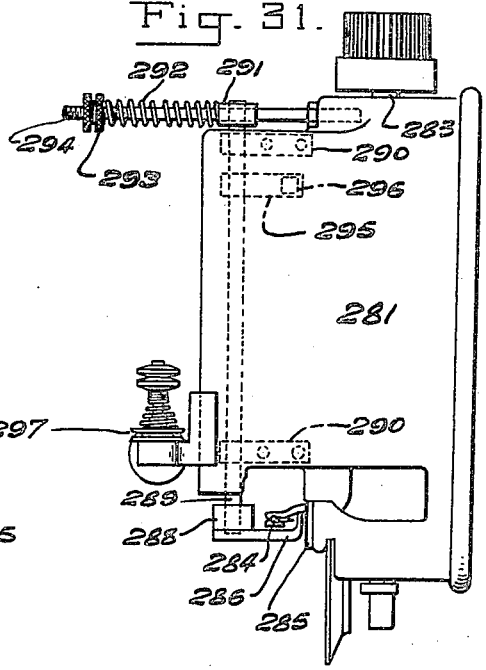
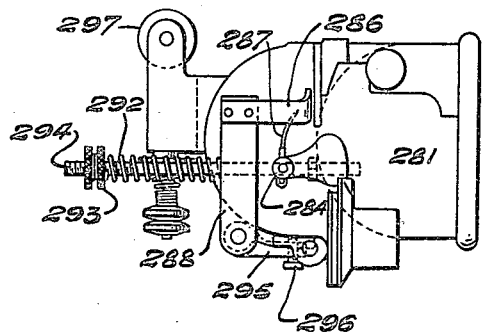
Inventor
John T. Dalton
By James L. Norris
Attorney Oct. 16, 1928.
J. T. DALTON
1,688,268
BAG MAKING AND FILLING MACHINE
Filed Aug. 19, 1927    20 Sheets-Sheet 13
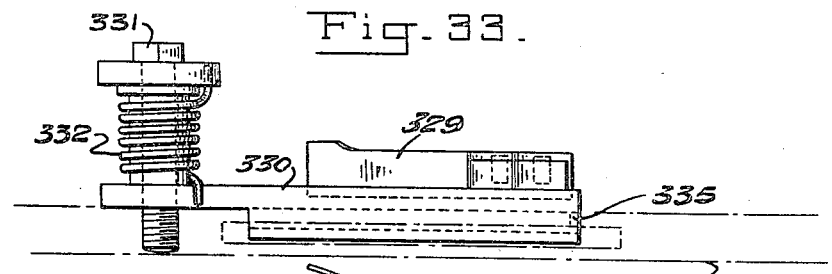
Fig. 33.
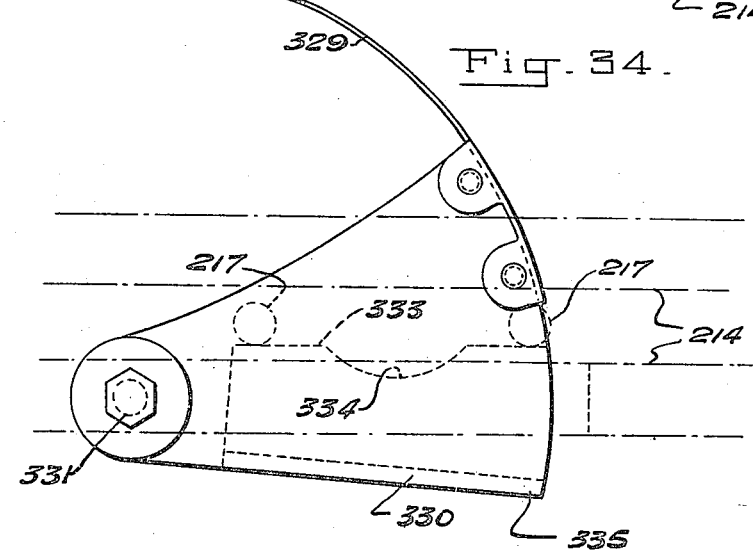
Fig. 34.
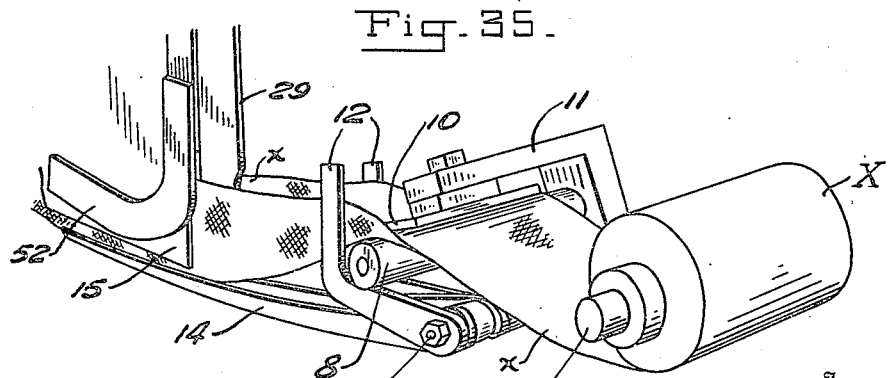
Fig. 35.
Inventor
John T. Dalton
By
Attorney

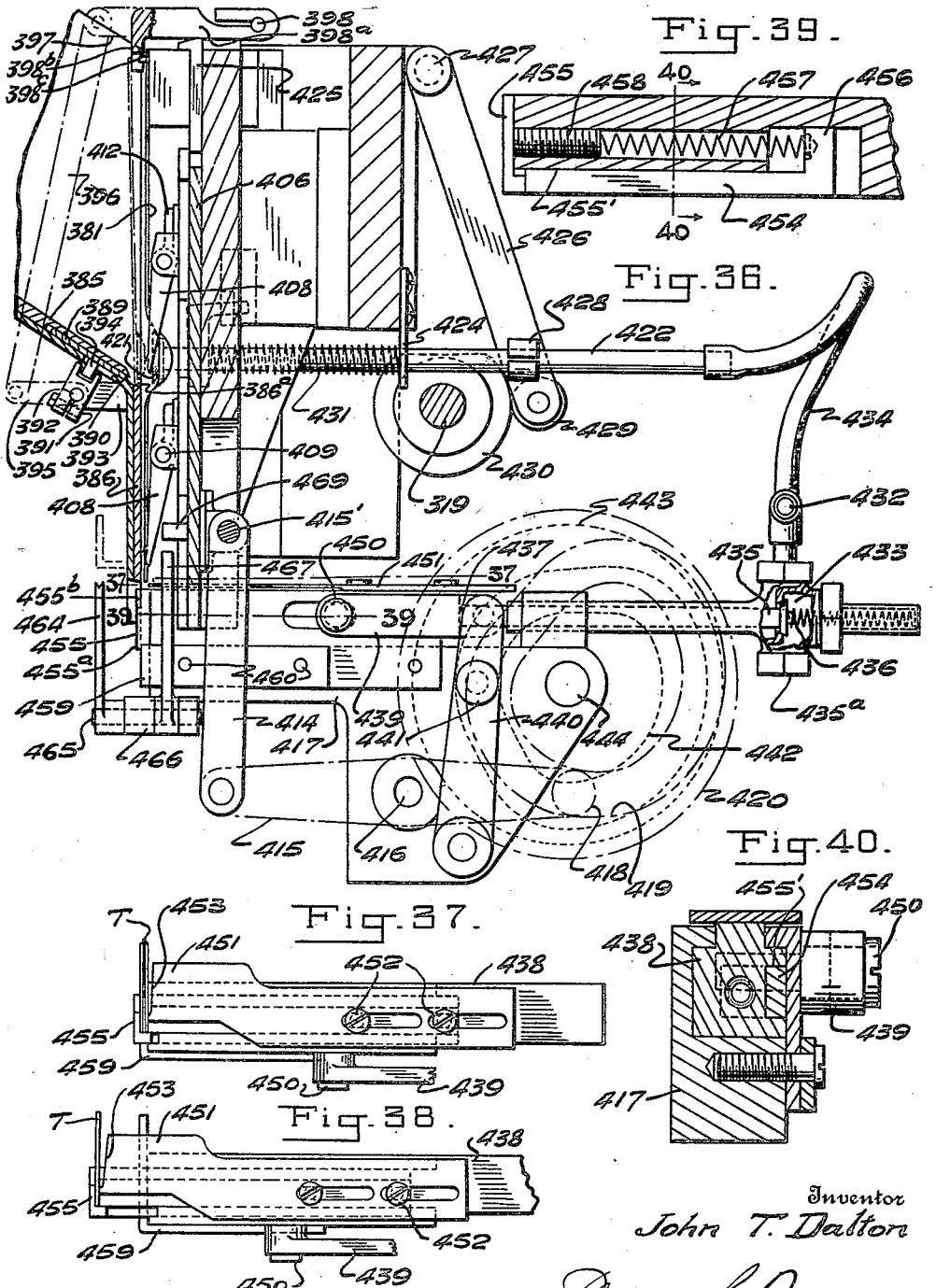

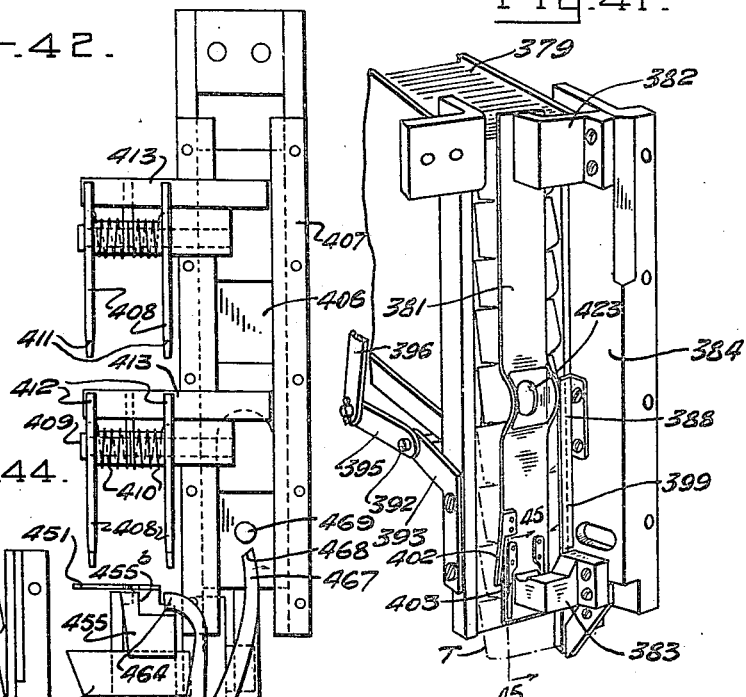
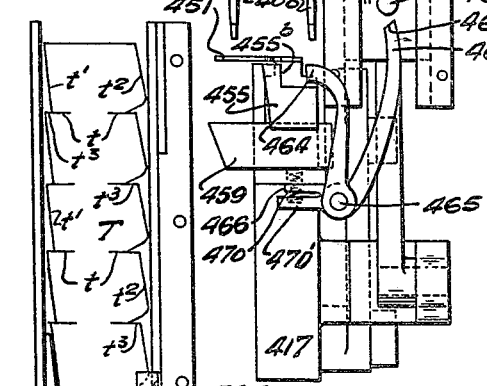
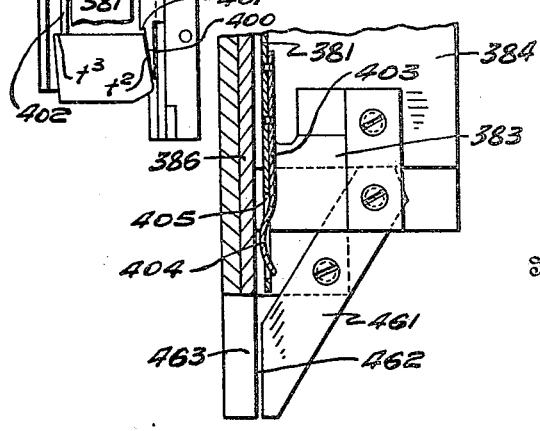

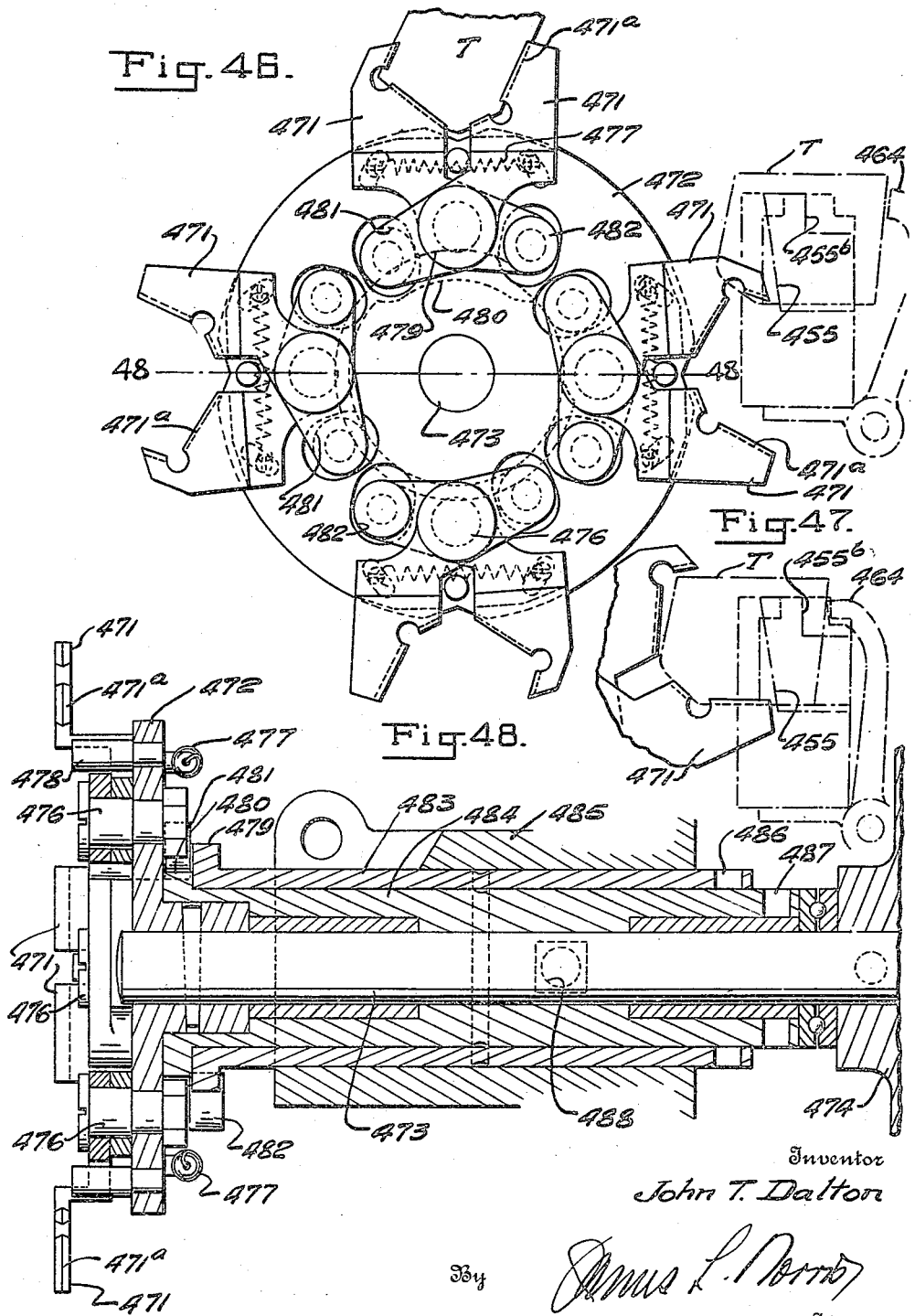

Oct. 16, 1928. 1,688,268
J. T. DALTON
BAG MAKING AND FILLING MACHINE
Filed Aug. 19, 1927 20 Sheets-Sheet 17
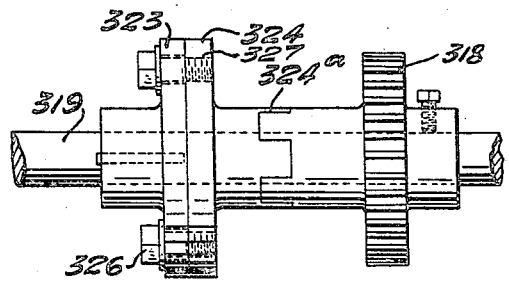
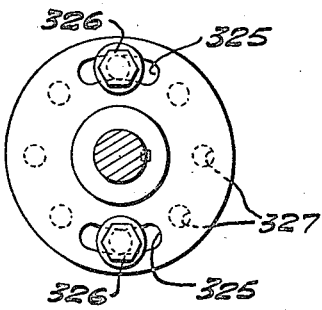
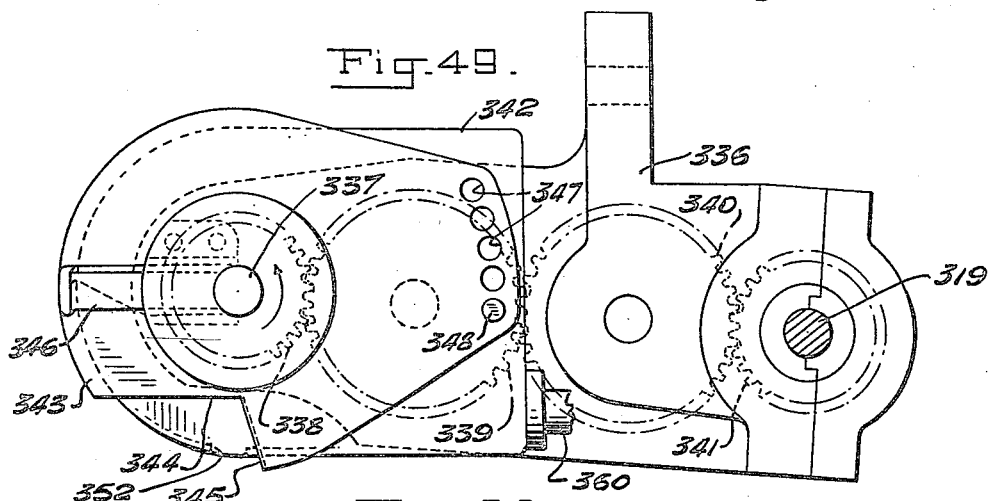
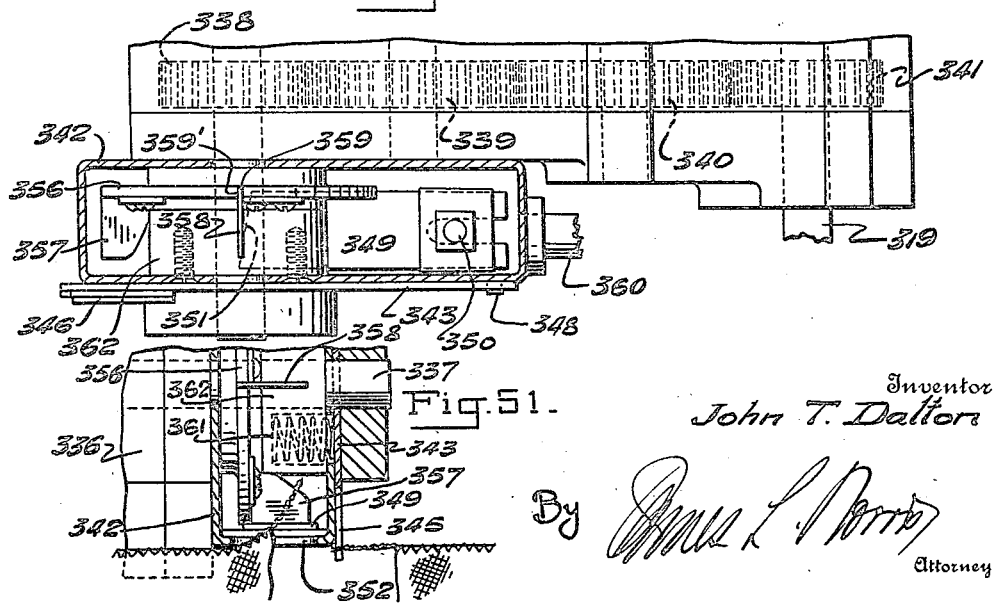
Inventor
John T. Dalton
By
Attorney

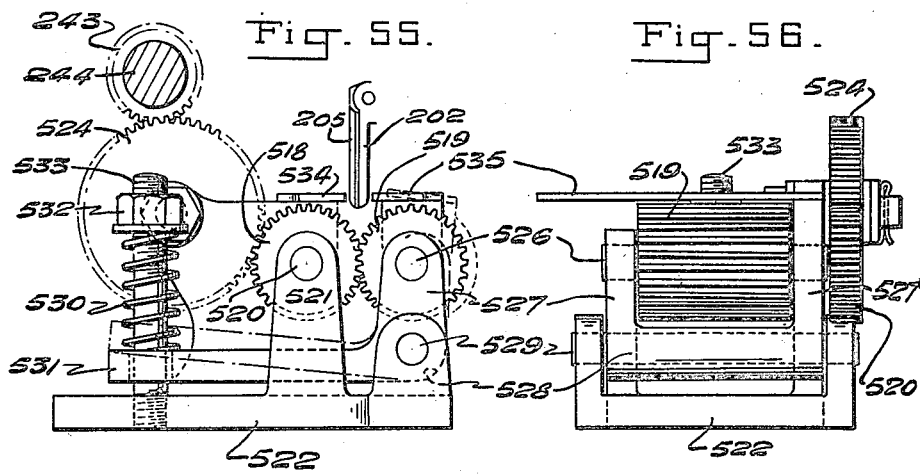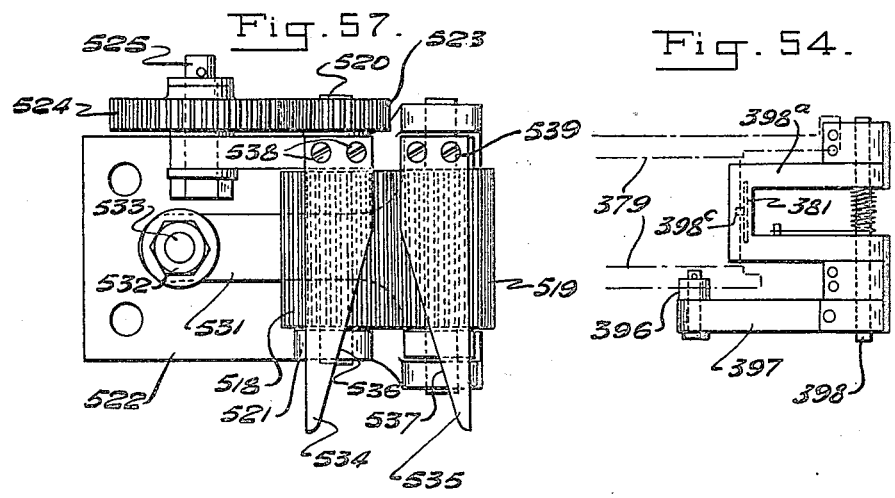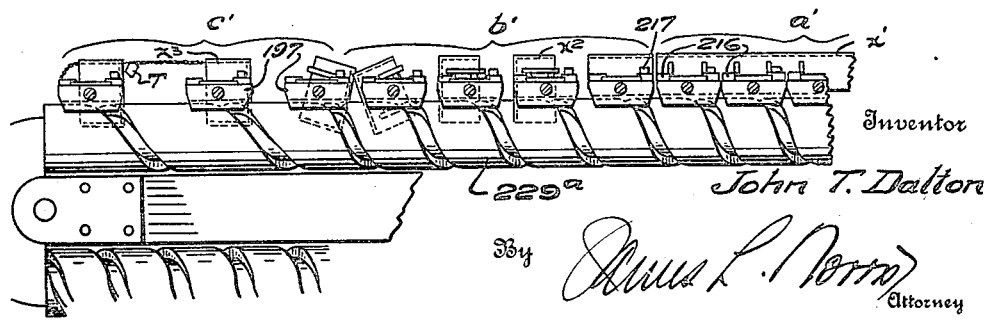

Oct. 16, 1928.
J. T. DALTON
BAG MAKING AND FILLING MACHINE
Filed Aug. 19, 1927  20 Sheets-Sheet 19
1,688,268
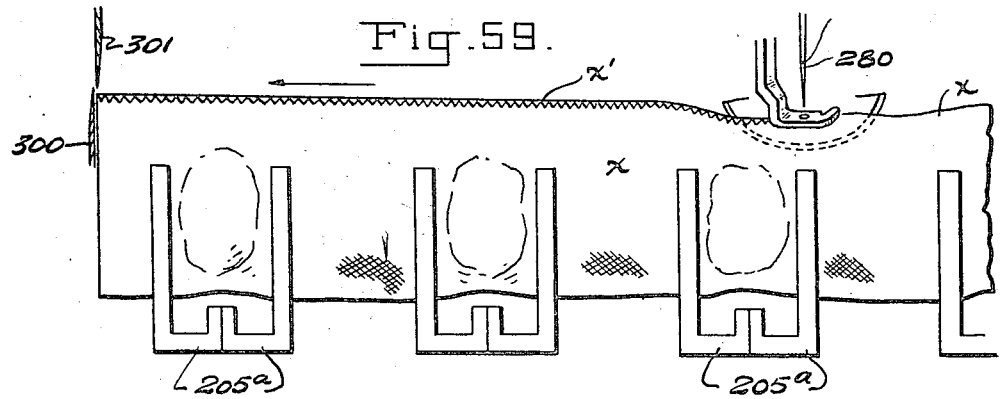
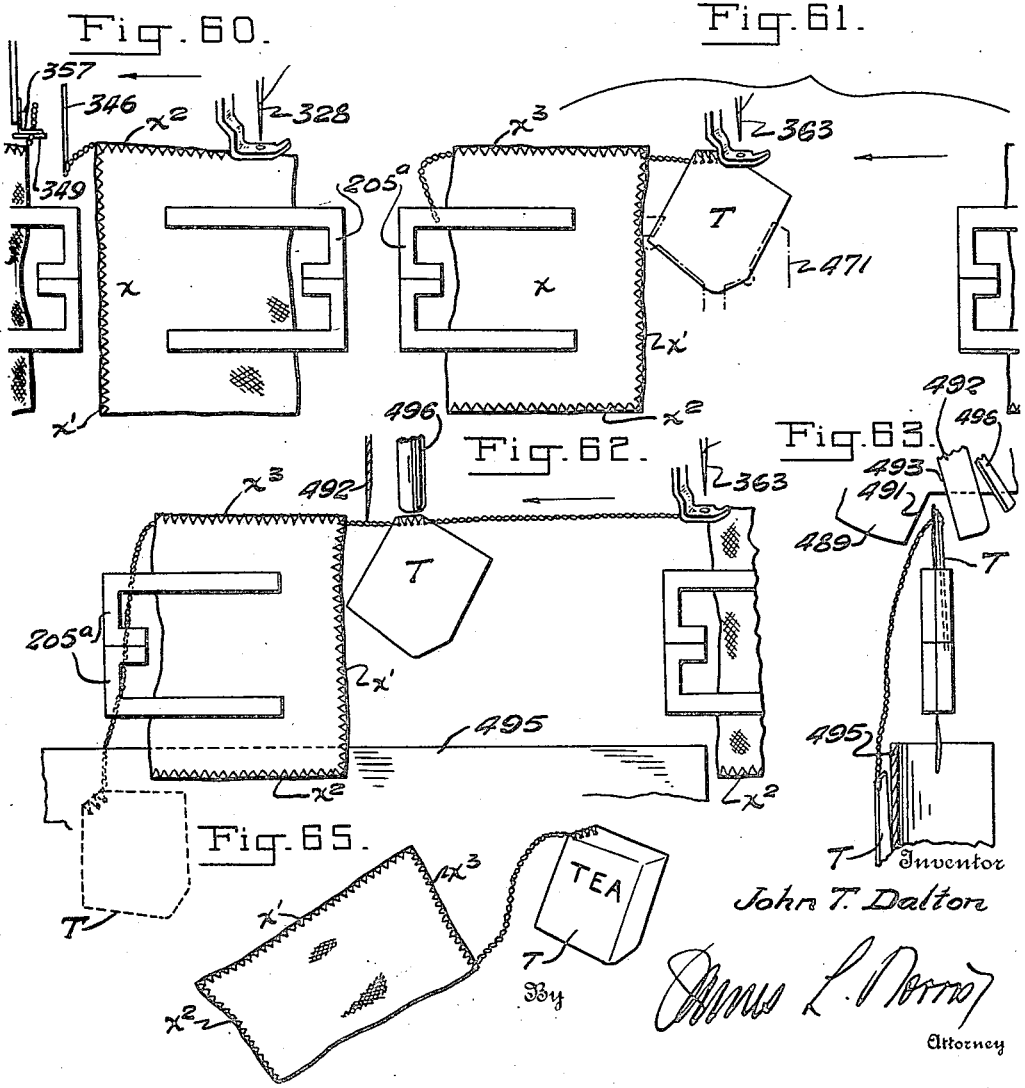

Oct. 16, 1928.
J. T. DALTON
1,688,268
BAG MAKING AND FILLING MACHINE
Filed Aug. 19, 1927      20 Sheets-Sheet 20
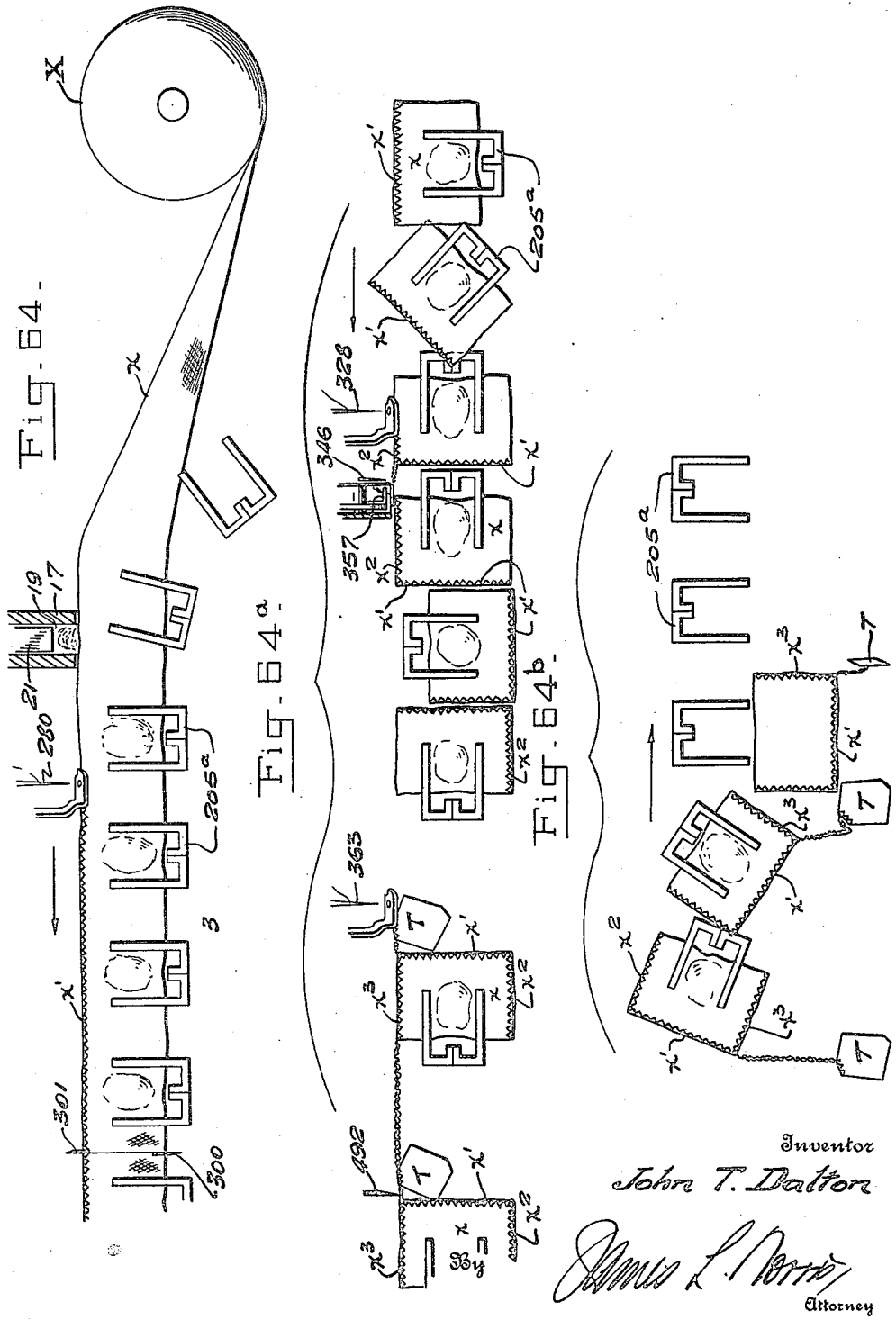

Patented Oct. 16, 1928.

1,688,268

UNITED STATES PATENT OFFICE.

JOHN T. DALTON, OF DURHAM, NORTH CAROLINA, ASSIGNOR OF ONE-HALF TO RICHARD H. WRIGHT, OF DURHAM, NORTH CAROLINA.

BAG MAKING AND FILLING MACHINE.

Application filed August 19, 1927. Serial No. 214,165.

The present invention relates to the packaging of tea and similar materials in bags and like receptacles, and it relates more particularly to the packaging of tea or the like in fabric bags or enclosures to form cartridges which contain charges of the tea or the like from which infusions are made. The primary object of the invention is to enable such packaging to be accomplished rapidly and inexpensively, it eliminating or reducing to a minimum the necessity for hand labor.

The present invention enables tea or other material to be rapidly formed into weighed or predetermined charges and successively deposited between the folded portions of a longitudinally advancing strip of fabric or other suitable material, and while the charges are confined at proper points in the length of the strip, the latter may be severed in suitable lengths to form bags, each containing a charge, and each bag length may be sewed at each of its free edges to form a closed bag which will effectively confine the charge therein and preventing sifting or leakage therefrom. The invention also enables tags to be fed to the bags and to be attached thereto by extension of the sewing thread beyond one of the edges of the tag, the extended thread being severed so that a tag will be attached to each bag.

A subsidiary object of the invention is to provide novel and improved means for feeding and weighing the tea or similar material whereby the same may be rapidly formed into accurately weighed charges and delivered to the bag making or filling means.

Another object is to provide novel and improved means for depositing the charges successively into a folded strip of bag making material and for confining each charge within a small area until the strip is engaged by a gripper which then acts to confine the respective charge while such portion of the strip is being advanced, severed into a bag length and sewed to form the bag, auxiliary means being provided for advancing the portion of the bag forming strip which receives the charge prior to its engagement by the gripper.

Another object is to provide novel means for severing the bag forming strip, while it is advancing continuously, to form the bag lengths each of which contains a charge of tea, and for severing the threads used in sewing the severed edges of the bags.

Another object is to provide novel means for feeding tags and means for holding the tags in position to be stitched by the thread used for effecting the final sewing of the bags, whereby the tags will be attached to the respective bags by the sewing thread.

Another object is to provide a novel and improved system of travelling grippers together with conveyer means for advancing them and controlling means for opening and closing the grippers and for rotating them at appropriate points in their travel, whereby each gripper will be caused to automatically engage a portion of the length of the folded bag-forming strip, immediately after it has received a charge of tea or other material, and to act on said portion of the strip to advance it while confining the charge, to rotate said portion of the strip after it has been severed to form a bag length, to position different edges thereof for sewing, the gripper during these portions confining the charge to avoid leakage or loss thereof, and finally to release the sewed or completed bag for delivery.

Other objects of the invention are to provide novel structural features which contribute to the rapid and automatic performance of the various operations required to weigh the tea or other material into predetermined charges and to make bags in which such charges are enclosed.

To these and other ends, the invention consists in certain improvements and combinations and arrangements of parts all as will be hereinafter more fully described, the features of novelty being pointed out particularly in the claims at the end of the specification.

In the accompanying drawings:—

Fig. 1 is a side elevation of a tea bag making machine constructed in accordance with the preferred embodiment of the invention;

Fig. 2 is an elevation, on an enlarged scale, of the opposite side of the machine shown in Fig. 1, portions of the tea-feeding mechanism and the bag delivery mechanism being omitted;

Fig. 3 is a top plan view of the machine, on the same scale as Fig. 2, the tea-feeding and weighing mechanism being omitted;

Fig. 4 represents a horizontal section taken on the line 4—4 of Fig. 2, illustrating the driving means for one of the conveyer screws and the sewing machines;

Fig. 5 represents a vertical section taken on the line 5—5 of Fig. 4, this figure illustrating the upper and lower conveyer screws;

Fig. 6 represents a vertical cross section taken on the line 6—6 of Fig. 3 and looking toward the right in that figure;

Fig. 7 illustrates the severing knives used in severing the strip of bag-making material into bag lengths, the supporting and operating means being shown in axial section;

Fig. 8 is a detail view of one of the severing knives;

Fig. 9 represents, on an enlarged scale, a section taken on the line 9—9 of Fig. 4, this figure illustrating the bearings supporting the conveyer screws;

Fig. 10 represents on an enlarged scale and partly in section, one of the gripper units which serve to advance and manipulate the bag sections while the latter are being sewed and made into bags;

Fig. 11 is a top plan view of the gripper unit shown in Fig. 10;

Fig. 12 represents a section taken on the line 12—12 of Fig. 11;

Fig. 13 is a face view of the Geneva plate which serves to rotate and to control the rotative position of the grippers during their travel;

Fig. 14 represents on an enlarged scale a section taken vertically through the tea feeding and weighing mechanism;

Fig. 15 is a side elevation of a portion of the feeding mechanism shown in Fig. 14, this figure illustrating the driving means for the feeding devices;

Fig. 16 is a view of the feeding mechanism shown in Fig. 15 as viewed from the right in that figure;

Fig. 17 is a side elevation of one of the weigh hoppers of the weighing mechanism;

Fig. 18 is an elevation of the weigh hopper shown in Fig. 17 as viewed from the right in that figure;

Fig. 19 is a top plan view of the mechanism which acts to dump the weighed charged from a weigh hopper and the mechanism which restores the weigh hopper to its normal raised position;

Fig. 20 is a detail perspective view of a portion of one of the feed belts of the feeding mechanism;

Fig. 21 represents a vertical section taken transversely through the machine on substantially the line 21—21 of Fig. 3 and looking toward the left, this figure showing the tea feed and overflow chutes and the tea packing means in vertical section;

Fig. 22 represents on an enlarged scale, a vertical section taken on the line 22—22 of Fig. 21, it illustrating a valve for cutting off the supply of tea to the filling means of the machine, when such is desired;

Fig. 23 is a view, partly in section, of the means for feeding the charges into a pocket, the means for packing charges therein, the means for feeding the charge out of the pocket into the strip of bag making material, and the auxiliary grippers for confining the charges in the strip immediately after they have been transferred thereto from the filling pocket;

Fig. 24 is a detail sectional view illustrating diagrammatically the manner in which a charge of tea or similar loose material is introduced into the filling pocket while the discharge end thereof is closed by a gate and the feeding blade or plunger is retracted.

Fig. 25 represents a transverse section taken on the line 25—25 of Fig. 23, but showing the strip of bag-making material exteriorly of the filling pocket and the guard within which the strip passes;

Fig. 26 is a perspective view of the mechanisms which introduce the charges into the fabric strip, auxiliary members which assist in the advance of said strip while a charge is being introduced therein, the auxiliary grippers which contract or close the strip behind a charge after the same has been introduced into the strip, and devices for positively insuring complete closing of the grippers on the strip;

Fig. 27 is a detail perspective view of a portion of the structure shown in Fig. 26 as viewed from the right hand side thereof, this figure illustrating diagrammatically the manner in which the auxiliary grippers are advanced by the main grippers while the latter are moving into engagement with the strip;

Fig. 28 is a side elevation of one of the auxiliary strip-advancing members;

Fig. 29 is a top plan view of the strip-advancing member shown in Fig. 28;

Fig. 30 is an elevation of one of the sewing machines used to sew and thus close the marginal edges of the bags;

Fig. 31 is an elevation of the sewing machine shown in Fig. 30 as viewed from the right hand side of that figure;

Fig. 32 is a bottom plan view of the sewing machine as shown in Fig. 31;

Fig. 33 is an elevation and Fig. 34 is a top plan of one of the tuckers used to introduce the edges of the advancing bags into the sewing machines;

Fig. 35 is a perspective view of the folding and guiding means for the bag-making strip;

Fig. 36 is a vertical sectional view of the tag-feeding mechanism;

Fig. 37 represents a horizontal section taken on the line 37—37 of Fig. 36, illustrating the knife which severs the tags from the multiple tag strips and the holder which presents the tags individually to the tag gripper;

Fig. 38 is a view similar to Fig. 37 but showing the parts in the positions which they occupy after a tag has been severed from the strip and shifted into position for engagement by the tag gripper;

Fig. 39 represents a fragmentary section taken on the line 39—39 of Fig. 36;

Fig. 40 represents a cross section taken on the line 40—40 of Fig. 39;

Fig. 41 is a perspective view of the delivery end of the tag-feeding magazine;

Fig. 42 is an elevation of the reciprocatory tag feeding grippers, the holder for positioning the tags after they have been severed from the strip, and the finger for transferring the tags from the holder to the tag gripper;

Fig. 43 is a detail perspective view of one of the tag feeding grippers, illustrating diagrammatically the manner in which this gripper cooperates with the strip of tags to advance the same;

Fig. 44 is an elevation of the delivery end of the tag magazine, illustrating the devices which control the delivery of the tags;

Fig. 45 represents on an enlarged scale, a section taken on the line 45—45 of Fig. 41, looking in the direction of the arrows;

Fig. 46 is a view in elevation of the grippers which transfer the tags from the tag magazine to a position for attachment to the bags, one of the grippers being shown holding a tag in attaching position;

Fig. 47 is a detail diagrammatic view showing one of the grippers and the manner of introducing a tag thereto;

Fig. 48 represents a section taken through the grippers and their supporting and controlling means, the section being taken on the line 48—48 of Fig. 46;

Fig. 49 is an elevation of the severing means for cutting the thread between adjacent bags;

Fig. 50 is a top plan view, partly in section, of the severing means shown in Fig. 49;

Fig. 51 is a sectional view of a portion of the severing means shown in Figs. 49 and 50 illustrating diagrammatically the manner in which the threads between adjacent bags are severed and the ends of these threads are trimmed off;

Fig. 52 is a detail view of the coupling used to time and drive the gear which drives the severing device for the bag making strip;

Fig. 53 is an elevation of the coupling as viewed from the left in Fig. 52;

Fig. 54 is a top plan view of the tag-feeding means;

Fig. 55 is a detail view of a device for removing any bag which may fail to discharge from its grippers at the bag-delivery point;

Fig. 56 is a side elevation of the device shown in Fig. 55 as viewed from the right thereof;

Fig. 57 is a top plan of the device shown in Figs. 55 and 56;

Fig. 58 illustrates a modified form of conveyer screw which may be used in carrying out the invention;

Fig. 59 is a diagrammatic view illustrating the steps of sewing the longitudinal edges of the folded bag-making strip containing the charges of tea or the like and severing the strip into bag lengths or sections;

Fig. 60 is a diagrammatic view illustrating the first sewing operation upon the severed bag sections and the severing of the sewing thread between adjacent bag sections;

Fig. 61 is a diagrammatic view illustrating the second sewing operation upon the severed bag sections and the sewing of the tags to attach them to the respective bags;

Fig. 62 is a diagrammatic view illustrating the sewing of a tag to the bag to which it is to be attached and the severing of the sewing thread from the adjacent bag;

Fig. 63 is a diagrammatic view, looking at Fig. 62 from the left hand end thereof, illustrating means for deflecting the tag on to a guard to avoid entanglement of the tag or its thread with an adjacent bag-carrying gripper;

Figs. 64, 64ª and 64ᵇ represent collectively the entire series of operations performed, in introducing the charges into the bag-making strip and making the bags therefrom and attaching the tags thereto;

Fig. 65 is a perspective view of the completed cartridge or bag containing a charge of tea and having a tag attached thereto.

Similar parts are designated by the same reference characters in all of the figures.

The invention is shown in the accompanying drawings and will be hereinafter described in detail as applied to the packeting of tea or the like in muslin or other textile fabric bags to form cartridges adapted for the preparation of tea infusions, but it is to be understood that the invention or features thereof are applicable to other uses. The preferred embodiment of the invention is shown and will be described, but is to be understood that the invention is not restricted to the precise construction shown as equivalent constructions are contemplated and such will be included within the scope of the claims.

In the present instance, the machine comprises a bed 1 which may rest on legs 2, the bed serving to support the various mechanisms of the machine, and preferably, the fabric strip which is to be used in making the bags is fed into the machine at one end, the left hand end in Fig. 1, the tea or like material is fed to the machine from above, and the bags or cartridges containing the tea are delivered from the opposite end of the machine, or the right hand end thereof in Fig. 1.

*Fabric strip feed.*—The bags made by the machine and in which the tea is enclosed are composed of muslin or other relatively open mesh textile fabric which is preferably supplied to the machine in the form of a roll X, the strip being of sufficient width to allow folding or doubling thereof along its median longitudinal line to form the two sides of the bags. The roll of fabric may be mounted on a mandrel 3 which provides a supporting axis about which the fabric roll may revolve during unwinding of the fabric strip therefrom, the mandrel being removably fitted in the forked upper end of a frame 4, the lower end of the latter being mounted on a shaft 5 which is supported by an extension 6 which may be bolted or otherwise secured to one end of the bed 1, and set screws 7 are preferably provided for adjusting the angular position of the frame 4 about the shaft 5 as an axis. The fabric strip *x* unwinding from the roll passes over an idler roll 8 (Fig. 35) which may be journalled in a suitable bracket 9 (Fig. 1) which is mounted in fixed position on the bed, and as the strip passes over the roll 8 it passes beneath a shoe 10 which is supported by a bracket 11, this shoe being tapered or wedge shaped, as shown at the right hand end of Fig. 3, the edges of the shoe converging to a point located at the center of the width of the strip, or substantially so. At opposite sides of the shoe and opposite to the converging edges thereof are arranged a pair of upstanding fingers 12 which may be secured in properly adjusted position on the bracket 9 by the bolt 13. These fingers engage respectively the longitudinal edges of the strip and turn them upwardly and inwardly while the middle portion of the strip is held down or against the roll 8 by the shoe, and as the strip passes the inner or pointed end of the shoe it will have an approximately doubled or folded form, the line of fold being along the median longitudinal center of the strip.

Beneath the roll 8 and shoe 10 is arranged a guide 14 which is trough shaped in cross section, this guide being adjustably supported on the bracket 9, through the medium of the bolt 13, and it is in a position to receive and support the doubled central portion of the fabric strip beyond the roller 8 and shoe 10. Above the guide 14 are arranged a pair of plates 15 which are spaced laterally to receive between them the upstanding longitudinal edges of the fabric strip, as will appear from Fig. 25.

*Filling means.*—As the fabric strip is advanced longitudinally within the machine, by means which will be hereinafter described, weighed or otherwise determined charges of tea are deposited within the folded or upstanding sides of the strip at intervals in the length of the latter. The means for introducing the charges into the folded strip is shown particularly in Figs. 21 to 27 inclusive. It comprises a pocket 16 which is trough shaped in transverse section, as is shown in Fig. 25, and this pocket occupies a position between the upwardly folded sides of the fabric strip, as is shown in that figure, the bottom of the pocket reaching substantially to the bottom folded portion of the strip which rests on the guide 14. Preferably, the pocket 16 is composed of sheet metal doubled or folded into appropriate form, and the upper edges of the pocket and the upper edges of the plates 15 are riveted or otherwise secured to a bracket 17, the latter being bolted or otherwise secured to a frame 18 which is mounted on the bed 1. A passageway 19 extends vertically in the lower portion of the bracket 17 and leads into the pocket 16, as is shown in Fig. 21, the upper end of this passageway being open at one side of the bracket 17 and in communication with a chute 20 through which the previously weighed charges of tea are supplied successively to the pocket. A packing blade 21 is arranged within the passageway 19, it fitting sufficiently loosely therein to allow the tea to pass behind it, and this packing blade operates, after each charge of tea has been introduced into the pocket, to pack the tea in the lower portion of the pocket where it will all be in a position to be transferred by a feeding blade 22 from the pocket to the fabric strip. Fig. 24 shows the charge in the form it assumes in front of the feed blade 22 prior to the advance of the feeding blade 22, the packing blade being in raised position during the feed of the tea into the pocket, and after the charge of tea has been supplied to the pocket, the packing blade 21 descends so that its lower edge is below the top edge of the feed blade 22 substantially as shown in Fig. 24, whereby the top of the charge of tea will be lowered to a level below the upper edge of the feed blade 22, after which, the packing blade will be raised to a position slightly above the upper edge of the feed blade, it being then in a position to prevent upward displacement of the tea, so that all of the charge will be pushed out of the right hand end of the pocket (Fig. 24) when the feed blade 22 makes a stroke in that direction. The packing blade 21 may be operated at appropriate intervals by a lever 23 an end of which extends through a slot 24 in a wall of the chute 20 and is fixed to the upper end of the packing blade 21, the intermediate portion of this lever being mounted on a pivot 24 which is supported by a bracket 25 secured to a side of the frame 18, the opposite end of the lever 23 carrying a roller or projection 26 which rides on an appropriately shaped cam 27 which is fixed on a shaft 28. A spring 29 serves to hold the roller 26 in contact with the cam 27, and the cam 27 is so shaped and timed that the packing blade 21 will occupy its normal elevated position, as shown in Fig. 23 until a charge of tea has been introduced into the pocket 16 whereupon the lever 23 will be rocked about its pivot 24 in a direction to cause descent of the packing blade 21 to pack the charge of tea within the space in front of the feed blade 22, after which the cam 27 swings the lever 23 in a reverse direction to elevate the packing blade 21, the latter being removed from the path of movement of the feed blade 22.

The feed blade 22 is carried by an arm 29 which is pivoted to swing on a shaft 30, the latter being supported by the frame 18, the blade 22 entering the end of the pocket 16 opposite to that from which the charges are discharged, and preferably the feed blade 22 is segmental in form, its arc being concentric with the shaft 30. The bottom wall of the pocket 16 is also preferably arcuate in form and concentric with the shaft 30, the concentricity of the bottom of the pocket and the lower edge of the feed blade enabling these parts to operate in relatively close relationship, thereby insuring substantially complete removal of all of each charge of tea from the pocket at each stroke of the feed blade.

The feed blade 22 occupies its normal retracted position, as shown in Fig. 24, during the introduction of each charge of tea into the pocket, and after the packing blade 21 has descended to compact the charge and has partially returned to its normal elevated position, the feed blade is caused to swing toward the right in Fig. 24 and thus sweep the charge of tea out through the right hand end of the pocket into the folded fabric strip $x$ which is arranged exteriorly of the pocket, and after the charge has been removed from the pocket, the feed blade 22 is retracted into substantially the position shown in Fig. 24, ready to receive another charge of tea in the space in front of it. The feed blade is actuated in the present instance by a link 31 which is pivotally connected to the arm 29 and to a pin 32, the pin 32 being carried by the upper end of a lever 33 which latter is pivoted at its lower end in a bracket 34 secured to the bed 1 and is provided at a point intermediately of its length with a roller or projection 35 which cooperates with a suitably shaped and timed cam 36, said cam being fixed on a longitudinal shaft 37, the latter being driven by a gear 38ª, fixed thereon and meshing with a pinion 36ᵇ fixed on a shaft 244. The shaft 28 carrying the cam 27 which actuates the packing blade may be driven from the shaft 37 carrying the feed blade actuating cam 36 by sprocket wheels 38 and 39 fixed on these shafts and connected by a chain 40, maintenance of the proper timing between the cams 27 and 36 being thus insured.

A gate 41 is provided which closes the discharge end of the pocket to confine the charge therein until ready for transfer to the fabric strip, whereupon this gate is removed from the path of the charge. This gate, as shown in Figs. 23, 24 and 27, is in the form of a blade the lower end of which is movable into a position between the sides of the pocket 16 so as to form a closure for its discharge end. The gate is shown completely closed in Fig. 24 and partially opened in Fig. 23. The gate is attached at its upper end to a bar 42 and said bar is fixed to a slide 43, the latter operating vertically in a guideway 44 formed in a side of the bracket 17, whereby vertical reciprocations of the slide 43 will lower and thus close and raise and thus open the gate. The opening and closing movements of the gate are performed in proper timed relation to the feed and return strokes of the feed blade 22 by a link 45 which is pivotally connected to the slide 43 at 46 and is pivotally connected at 47 to an arm 48, the latter being mounted on a shaft 49 which is supported by the frame 18, the arm 48 being connected to an arm 50 so that these two arms swing in unison about the center of the shaft 49 as an axis. The lower end of the arm 50 is provided with a slot 51 in which the pin 32 fixed to the upper end of the lever 33 operates. The gate operating means is thus connected to the same lever which operates the feed blade on its feed and return strokes, the arm 48 being swung upwardly to elevate the gate into its open position while the feed blade is advancing on its feed stroke and the arm 48 being swung downwardly to lower the gate into closed position during the return stroke of the feed blade. Means is preferably provided which directly acts on the fabric strip $x$ exteriorly of the pocket to advance the fabric strip at the moment the charge of tea is being transferred thereto from the pocket. Such means comprises in the present instance a pair of blades 52 which are riveted or otherwise secured to a lever 53, the latter being pivoted at 54 to brackets 17 and having an extension 55 beyond its pivot which is adapted to bear against the brackets 17 and thus act as a limit stop. The extension 55 of the lever is normally held against the bracket 17 under the expansive tendency of a spring 56.

The blades 52, which are composed of resilient material and have a normal tendency to move relatively toward one another straddle the plates 15 within which lie the upturned sides of the fabric strip. Each of the blades 52 is provided at its inner side with a toothed block 57 which is arranged to project through a slot 58 formed in the respective plate 15 and to bear against the respective side of the fabric strip, the latter being backed and thus supported by the respective side wall of the pocket 16. A portion of the lever 53 is in the path of a surface 59 on the arm 29 so that when the latter reaches a suitable point in its forward swing, the surface 59 thereon will abut against the lever 53 and, swinging the latter about its pivot 54, will force the blades 52 to advance in unison with the feed blade 22. The pressure of the roughened or toothed blocks 57 on the blades 52 against the respective sides of the fabric strip at the outer sides of the pocket 16 will thus cause the fabric strip to advance in unison with the stroke of the feed blade 22 which transfers the charge of tea from the pocket into the fabric strip. The final portion of the rearward swing of the blades 52 preferably takes place while the blocks 57 are out of engagement with the fabric strip, so that these blades will not resist or otherwise interfere with the further advance of the fabric strip through the operation of other mechanisms which will be hereinafter described. Such release of the blocks 57 from the fabric strip is preferably effected by the wedge shaped cams 60 which are arranged on the outer sides of the plates 15 in positions to be engaged by lugs 61 on the respective blades 52, these cams being inclined in a direction to deflect the blades 52 outwardly during the final portion of their return stroke, thereby retracting the blocks 57 from contact with the fabric strip. The teeth of the fabric-engaging blocks 57 are preferably bevelled or inclined as shown in Figs. 28 and 29, so that during the return stroke of the blades 53, which takes place under the action of the spring 56 during retraction of the feed blade 22, will take place without imparting retrograde motion to the fabric strip or otherwise interfering with its advance. Normally, the blades 52 will occupy the relatively retracted position shown in Fig. 23, they being held yieldingly in that position by the spring 56 which presses the end 55 of the lever 53 against the bracket 17.

After each charge has been introduced into the folded strip from the pocket and prior to the retraction of the feed blade 22, the sides of the strip are preferably closed against one another to confine the charge to the point in the length of the strip at which the charge is deposited and to prevent back-flow of any part of the charge toward the pocket. For accomplishing this purpose, a pair of grippers 62 are provided, these grippers being bladelike in form and arranged at opposite sides of the strip in the vicinity where the strip passes from the pocket. These grippers are pivotally suspended from pivot pins 63 so that the grippers may swing in a plane toward and from one another and transverse to the length of the fabric strip, such movements of the grippers enabling them to grip and release the strip, and a tension spring 64 connects the grippers and tends to draw them toward one another against the strip and to hold them yieldingly in engagement therewith, causing a pressure of the grippers on the fabric strip which closes the folded sides of the strip against one another at a point in immediate proximity to the forward end of the feed blade 22 and thereby prevents rearward escape of any of the charge of tea contained in the strip in advance of these grippers.

The pivots 63 about which the grippers swing transversely are carried by a bracket 65, and this bracket is suspended on a shaft 66 which rotates freely in bearings 67. The grippers are preferably arranged on the bracket 65 on one side of the shaft 66, and the weight of the suspended grippers tends normally to swing them rearwardly or toward the bracket 17 so that the strip-engaging portions of the grippers will occupy a position adjacent to the discharge end of the pocket, when the grippers are released or are unrestrained. In addition, the bracket 65 is preferably provided with a rearward extension 68 which is in a position to be engaged by the bar 42 on the slide 43 as the latter approaches the end of its up stroke, the force thus applied by the bar 42 to the extension 68 acting to positively restore the grippers 62 to their normal rearward retracted position adjacent to the discharge end of the pocket 16. A wedge or cam 69 is provided for spreading apart the grippers 62 and thereby releasing them from the fabric strip. This wedge is mounted in the present instance on an arm 70 and it is arranged to operate in a space formed by recesses 71 in the adjacent sides of the grippers. The lower side of the wedge 69 is tapered or bevelled so that when this wedge is moved downwardly it will engage the inner sides of the grippers and spread them apart, the spreading motion of the grippers taking place about the pivots 63 and in opposition to the action of the spring 64. The arm 70 is fixed on a shaft 72 which is mounted in a suitable bracket 73 arranged on a part of the frame 18, the shaft 72 having an arm 74 fixed thereon, this arm being operatively connected to a rod 75 (see Fig. 21) the lower end of which carries a roller 76 which rides on a cam 77, the latter being fixed on the shaft 28. The cam 77 is so shaped and timed in relation to the feed blade and gate-operating cam 36 that the wedge 69 will be in lowered position, thus holding the grippers 62 out of engagement with the fabric strip until the feed blade 22 has made a stroke to transfer a charge from the pocket 16 into the fabric strip. Immediately after a charge has been thus introduced into the fabric strip, the wedge 69 is lifted, thus allowing the spring 64 to close the grippers 62 on the portion of the strip adjacent to the discharge end of the pocket and immediately behind the charge of tea contained between the sides of the strip. Backflow of tea from such charge is thus prevented by the consequent closing of the sides of the strip closely against one another under the pressure of the grippers. The grippers 62 advance along with the fabric strip, they being engaged by other grippers which will be hereinafter described, and after the grippers 62 have advanced to a predetermined extent, the wedge 69 is lowered thereby spreading the grippers 62 and disengaging them from the fabric strip. The grippers 62 are then free to swing back to their normal or initial position adjacent to the discharge end of the pocket 16, and positive return of the grippers to this position is insured by the up stroke of the slide 43.

*Tea feeding and weighing mechanism.*—The tea to make up the charges for the bags or cartridges is preferably fed under proper control to weighing devices and weighed so that the charges will be uniform. The feeding and weighing devices are shown particularly in Figs. 14 to 20 inclusive. The tea is fed into a hopper 78 and it descends by gravity therein on to an endless travelling belt 79. This belt passes over rollers or pulleys 80 and 81 which are fixed on shafts 82 and 83 respectively, and the belt may be maintained under proper tension by an idler pulley 84 which may be arranged to act on the lower stretch of the belt. The tea resting on the upper stretch of the belt 79 is moved toward the left in Fig. 14 and it is discharged from this belt, at a substantially uniform rate, by a revolving roll 85 which is provided with a number of circumferential rows of radially projecting pins 86 the ends of which work in close proximity to the surface of the belt 79 adjacent to the roll 80, the ends of these pins moving in the same direction in which the surface of the belt is travelling. By operating the belt 79 and the roll 85 at appropriate relative speed, substantially uniform regulation of the discharge of tea from the belt 79 is accomplished. Adjustment of the rate of discharge of tea from the belt 79 may be effected by means of a gate composed of a series of arms 87 which lie in the circumferential spaces between the rows of pins 86 and are substantially concentric with the roll 85, these arms being all fixed to a bracket 88 which is pivoted at 89 in the sides of a housing 90, and the shaft 89 at the outside of the housing is provided with an adjusting lever 91 by means of which the shaft 89 may be rotated, thus swinging the fingers 87 toward or from the adjacent portion of the belt 79, and thereby reducing or enlarging the passageway between the belt 79 and the roll 85 and thereby regulating the amount of tea flowing through this passageway. The lever 91 is preferably provided with a locking plate 92 having a slot 93 therein to receive a locking bolt 94 whereby the lever 91 may be locked in position for adjustment thereof. The radial pins 86 act as feeders to advance the tea so that it will discharge from the belt 79 and they also act to break up any lumps which might otherwise tend to clog the feeding mechanism or impair the uniformity of feed.

In order to prevent bridging or clogging of the tea at the point where the outlet of the hopper 78 joins the housing 90, a series of toothed disks 95 are arranged above the belt 79 in advance of the discharge roll 85, these disks being fixed on a shaft 96, said shaft being supported at its ends by a bracket 97. The shaft 96 is driven by means hereinafter described whereby the disks 95 will revolve in a clockwise direction, Fig. 14, and will act to break any bridge that may be formed adjacent thereto by the tea and the disks will insure a steady feed of tea to the conveyer 79 and roll 85. A gate 98 is provided to control the flow of tea to the disks 95, the gate having vertical slots through which portions of the disks project, the gate extending preferably to or slightly below the bottoms of the disks, and the gate is preferably adjustable vertically to vary its height above the belt 79 for which purpose it is provided with a bracket 99 at its upper end which is adjustable vertically on a threaded rod 100 which may be mounted on the bracket 97. A pair of nuts 101 threaded on the rod 100 and arranged above and below the bracket 99 serve to adjust the gate vertically and to retain in adjusted position.

In order to obtain a uniform feed of the tea at an appropriate rate to insure steady feeding of the tea to the weighing devices, the tea is deposited successively on travelling conveyers of a suitable number, one below the other and travelling at a relatively higher speed so that the depth or amount of tea on one conveyer is less than that on the conveyer above it. Although any desired number of these conveyers may be used as circumstances may require, two conveyers are shown in the present instance, such conveyers comprising the conveyer 79 already described and a conveyer 102 which is arranged beneath it and is driven at a relatively higher speed so that the tea on the conveyer 102 will be of relatively shallow depth thereon. The conveyer 102 is composed of a flexible endless band which travels over pulleys or rollers 103 and 104 and the roller 104 may be magnetized to remove any nails or similar metal débris from the tea. This conveyer may be maintained at proper tension by an idler roll 105 which may bear on the lower side of the lower stretch of the belt. The upper stretch of the belt which receives the tea may be supported by a relatively fixed plate 106 which may be attached at its ends to opposite sides of the housing 90 and occupies the space between the rolls 103 and 104. The tea discharged from the left hand end of the belt 79 (Fig. 14) is directed on to the upper stretch of the belt 102 by an inclined plate 107, the upper stretch of the belt 102 moving toward the right in Fig. 14. In order to insure uniform flow of the tea on to the belt 102, a suitable number of plungers 108 are mounted to operate through the lower portion of the plate 107, and these plungers are reciprocated rapidly by cams 109 which are fixed on a shaft 110 and cooperate with rockers 111 which are pivoted at 112 to a bracket 113 secured to the housing 90, the lower ends of the rockers being connected to the respective plungers 108 and springs 114 act on the different plungers to hold the rollers on the rockers in working relation with the cams 109. In order to prevent leakage or spilling of the tea over the longitudinal edges of the belt 102, these edges of the belt are provided with angle shaped plates 115 which are riveted or otherwise secured to the belt and have upstanding portions 116 which will act as dams to prevent overflow of the tea, these upstanding portions having offset flanges 117 which produce an overlapping joint between the angle plates. The discharge of tea from the right hand of the conveyer 102 (Fig. 14) is controlled by a revolving roll 118 which is provided with a number of circumferential series of radially projecting pins 119 the ends of which operate in close proximity to the surface of the conveyer 102 at a point where this conveyer bends over the roll 104, and the rate of discharge is made uniform throughout the width of the conveyer 102 by the action of the pins 119 and by a gate comprising a series of arms 120 which are curved to fit around the roll 118 and to lie in the spaces between the circumferential series of pins, the distance between the curved arms 120 and the adjacent surface of the conveyer 102 determining the size of the passageway through which the tea may discharge from this conveyer. The tea discharged from the conveyer 102 enters a series of chutes 121, these chutes being formed by partitions 122, the uniform distribution of the tea across the width of the conveyer 102, as it discharges from, insuring substantial uniform flow of the tea in all of these chutes. The chutes 121 are inclined at a suitable angle so that the tea will descend therein by gravity.

The driving means for the conveyers and the tea discharge rollers comprises preferably sprocket wheels 123 and 124 fixed on the shafts 82 and 83 respectively for the rolls 80 and 81 of the upper conveyer 79, these sprocket wheels being connected by a chain 125, and sprocket wheels 126 and 127 fixed on the shafts 128 and 129 of the rolls 103 and 104 respectively for the lower belt 102 over which sprocket wheels passes a chain 130. These sprocket wheels and chains will cause the pairs of rolls supporting the upper and lower belts to revolve respectively in unison, and the shafts 82 and 128 may be mounted in slidable brackets 131 and 132 and said brackets may be provided with adjusting screws 133 and 134 for the purpose of adjusting the tension on the conveyer belts and the chains cooperative therewith. The upper conveyer 79 is driven at a lower speed, preferably about half that of the lower conveyer 102, by a relatively large gear 135 fixed on the shaft 83 of the upper conveyer and meshing with a relatively small gear 136 fixed on the shaft 129 of the lower conveyer. The shaft 129 of the roll 104 of the lower conveyer is driven through a worm wheel 137 which is fixed thereon and meshes with a worm 138 the latter being fixed on a vertical shaft 139, and the lower end of this shaft is connected by bevel gears 140 to a horizontal shaft 141 which is mounted in the framework 142 which supports the feeding mechanism. The feed controlling rolls 85 and 118 and also the cam shaft 110 are driven by a chain 143 which engages a sprocket wheel 144 on the shaft 141, and also engages sprocket wheels 145 and 146 on the shaft 147 and 148 of the rolls 118 and 85 respectively, and this chain also engages a sprocket 149 fixed on the cam shaft 110, so that motion of the chain 143 will drive the discharge controlling rolls 118 and 85 and will serve to actuate the plungers 108. A slack adjusting idler sprocket 150 may also be arranged for the passage of the chain 143 thereover. The shaft 96 carrying the disks 95 is revolved in a clockwise direction Fig. 14 by a sprocket wheel 96ª fixed thereon and cooperating with a chain 96ᵇ the latter cooperating with a sprocket 96ᶜ fixed on the shaft 128 of the lower conveyer.

The shaft 141 which drives the feed devices is in turn driven from a shaft 151 through gears 152 and 153. The shaft 151 may be driven from a sprocket wheel 154 which is fixed thereon and is engaged by a chain 155, the latter being driven from a sprocket wheel 156 fixed on the shaft 28. Preferably a hand wheel 157 is fixed on the shaft 141 to enable the attendant to operate the feeding mechanism manually or independently of the power drive and in order to enable the feeding devices to be operated by manual rotation of the shaft 141, without interference from the power drive from the shaft 28, the gear wheel 153 which drives the shaft 141 is mounted rotatably or loosely thereon and is coupled to the shaft 141, when the power drive is in operation, by a spring actuated pawl 158 which is carried by the gear 153 and cooperates with a notched disk 159 fixed on the shaft 141 (see Fig. 15). By this arrangement, the shaft 141 may be rotated in a forward direction by the hand wheel 157, while the shaft is idle, the ratchet disk 159 fixed on the shaft 141 then riding idly past the pawl 158, but while the power driving shaft 151 is being driven forwardly, the consequent forward motion of the gear 153 will cause the pawl 158 thereof to engage and drive the ratchet disk 159.

The weighing means for making up weighed charges of tea comprises a set of weigh beams 160 which correspond in number to the number of chutes 121, six of these chutes being shown in the present instance, and each weigh beam has its supporting knife edges 161 arranged to rest in bearings 162 on a suitable stationary supporting bracket 163. One end of each weigh lever is provided with a counter-weight 164, these counter-weights being preferably adjustable as shown and the opposite end of each weigh lever has a weigh hopper 165 suspended therefrom by knife edges 166 as shown (see Figs. 14, 17 and 18). Each weigh hopper comprises a receptacle portion 167 in which the weighed charge of tea is made up, this receptacle portion having a door or gate 168 which is hinged at 169 and provided with a spring 170 which normally acts to close the gate and to retain it in closed position. Each weigh hopper is also provided with an overflow chute 171. The supporting bracket 163 is provided with a stop 172 on which the counter-weighted end of the weigh beam comes to rest when the weigh hopper is empty and on which the weigh beam remains at rest until the hopper end of the weigh beam is lowered under the weight of a weighted charge of tea in the weigh hopper. While the weigh beam rests on the stop 172, the overflow chute 171 at the top of the weigh hopper is elevated above the bottom of the chute 121 and in consequence, the tea descending this chute will enter the weigh hopper and it will continue to flow into the hopper until a sufficient amount has been received to overbalance the counter-weight and to cause the weigh hopper to descend. As soon as the overflow chute 171 descends to the level of the bottom of the chute 121, the flow of tea into the weigh hopper will be cut off, and the tea which continues to flow from the chute 121 will overflow through the overflow chute 171 and discharge into an overflow conduit 173 the upper end of which has a lip 174 thereon which will then aline with the bottom of the overflow chute 171 of the weigh hopper.

Adjacent to the overflow chute 173 is arranged a feed chute 175 which connects with the chute 20 which feeds tea to the pocket 16. Descent of the weigh hopper under the weight of the charge of tea therein brings the opening in the hopper controlled by the gate 168 into the upper end of the chute 175, as is indicated by the dotted lines in Fig. 14. The gate 168 is opened automatically and by power means, such means comprising a bar 176 which is pivotally mounted on the upper ends of a pair of links 177 and 178, the lower ends of these links being pivotally mounted at 179 and 180. One end of the bar 176 is provided with a pair of upstanding fingers 181 which straddle the weigh hopper and are arranged to strike lugs 182 which project from the opposite edges of the gate 168 when the bar 176 is shifted toward the right in Fig. 14, such movement of the bar 176 causing the respective gate 168 to swing into open position and thus dump the weighed charge of tea from the respective weigh hopper into the passageway 175. Each bar 176 is provided with a roller 183 which bears on a cam 184, the cam being so shaped that during the major portion of its revolution, the bar 176 will occupy its retracted position as shown by the full lines in Fig. 14 and the roller 183 is held in contact with the cam by a compressed spring 185 which acts on the link 177. The cam 184 however has a raised portion 184ᵃ which, when it engages the roller 183, shifts the bar 176 toward the right (Fig. 14) thereby causing the fingers 181 to act to push open the gate 168 and thereby dump the weighed charge of tea from the weigh hopper.

In order to insure the prompt rise of each weigh hopper after dumping a weighed charge therefrom and thus bring the hopper into a position to receive the next charge without delay, a restoring lever 186 is provided, this lever being pivoted at 187 and provided at one end with a lug 188 which is arranged to engage the lower end of a guide 189 attached to the weigh hopper, the opposite end of the restoring lever being arranged to cooperate with a cam 190 which is adjustably fixed on the shaft 141, the cam 190 being so shaped and set that the lever 186 will be rocked to bring the lug 188 thereon up against the guide 189 attached to the weigh hopper and to lift this weigh hopper into its elevated charge receiving position at a suitable interval of time after the bar 176 has been actuated to open the weigh hopper door 168. It will be understood that a number of bars 176 and controlling cams 184 is provided to conform with the series of weigh hoppers employed, the cams 184 of the series being preferably set in different angular positions on the shaft 141 so that the doors of the weigh hoppers will be opened at regular intervals, and that a series of restoring levers 186 is provided to conform with the series of weigh hoppers employed and that the cams 190 for the different restoring levers will be appropriately set to conform with the timing of the respective cams 184. Each of the weigh hoppers of the series is provided with a vertical guide 189, and the series of guides straddle a guide rod 191. The guide rod 191 will not interfere with the vertical movements of the respective weigh hoppers incident to the weighing of the charges and the dumping of the charges therefrom but will prevent deflection of the respective weigh hopper under the force applied by the fingers 181 of the bar 176 and these fingers act on the lugs 182 of the gate 168 to open it. Normally, however, the fingers 181 will be out of contact with the lugs 182 on the hopper doors and hence there will be no impairment of the accuracy of the weighing operations, especially if the pendant weigh hoppers and their guides 189 are properly balanced so that the guide 189 moves freely vertically with respect to the guide rod 191.

The overflow conduit 173, as is shown in Fig. 21, discharges the unweighed tea through a chute 192 from which such tea may be collected in a suitable receptacle and returned to the feed hopper. In some instances it may be desirable to operate the feeding and weighing mechanism independently of the remainder of the machine or without conducting the tea to the bag making strip. To enable this to be done, the chute 192 may be provided with a branch 193 adapted to communicate with the chute or passageway 175 which receives the weighed charges from the weighing devices, and a valve or wedge plate 194 may be mounted at the junction of the branch 193 with the passageway 175, as shown in Figs. 21 and 22. The valve or switch plate 194 as shown in Fig. 22 is fixed on a shaft 195 which extends to the exterior of the passageway and is provided with a lever or handle 196 by means of which it may be swung either into the position shown in Fig. 22, in which adjustment it will deflect the tea discharged from all of the weigh hoppers to the common passageway 175 into the branch 193, and thence into the overflow chute 192, although during the normal operation of the machine, the valve or switch plate 194 will be adjusted so that it closes communication between the overflow branch 193 and the passageway 175 which receives the tea discharged from all of the weighing devices, and the weighed charges of tea will then all pass to the chute 20 and thence in succession to the pocket 16.

The superposed feed conveyers driven at differential speeds, as hereinbefore described, in conjunction with the auxiliary feed controlling devices insure uniform discharge of tea into the several chutes leading to the several weighing devices, so that these weighing devices will make up the weighed charges and discharge them in substantially equal periods of time. By providing a set of weighing devices and employing discharging means therefor which acts successively on the weighing devices of the series, ample time will be allowed each weighing device to make up and correctly weigh each charge, although the dumping of the weighed charges from the several weighing devices into the common hopper or chute leading to the filling pocket will be sufficiently frequent to permit the rapid operation of the machine.

*Grippers and conveyers.*— Immediately before the fabric strip has received a charge of tea from the filling pocket, the strip is engaged by one pair of grippers which confine the charge to the appropriate portion of the strip, and after the strip has received a charge of tea and has been gripped by the auxiliary grippers, the strip is engaged by a second pair of grippers, and these pairs of grippers serve to advance the strip while the longitudinal edges of the strip are being sewed together, and after the fabric strip containing the charges of tea is severed into bag lengths or sections, the grippers serve to advance and manipulate the respective bag sections while their ends or severed edges are being sewed and while a tag is being attached to each bag, after which the grippers carry the finished bags to suitable delivery means where the grippers release the bags.

Each gripper unit comprises, as will appear from Figs. 10 to 13 inclusive, a block or slide 197 having a shaft 198 fitted rotatably therein, one end of this shaft having a bracket 199 fixed thereon, this bracket having a fork 200 which is off-set laterally of the axis of the shaft 198 and projects beyond the end thereof. In the arms of the fork is secured a shaft 201, the ends of this shaft outside the fork having grippers 202 rotatably mounted thereon, and these grippers have fingers 203 fixed thereto and extending to the inside of the fork, the lower ends of these fingers having arms 204 fixed thereon. The ends of the shaft 201 outside the fork 200 also have grippers 205 rotatably mounted thereon, these grippers having inward extensions $205^a$ which terminate in arms 206 which are fixed thereto but rotatably on the shaft 201. A stop bar 207 is arranged within the fork to be engaged on its under side by the arms 204 which are connected to the respective grippers 202 and to be engaged on its upper side by the arms 206 which are connected respectively to the grippers 205. Springs 208 are provided which act to yieldingly hold the arms 203 and 206 against the bar 207, one end of each spring being connected to one of the arms 204 and the other end of such spring being connected to the companion arm 206. When the arms 204 and 206 are forced toward or against the bar 207, the grippers 202 and 205 will be closed. The grippers are preferably in the form of straight fingers which form gripping jaws or faces between them, and in order to increase the security of hold of the grippers on the fabric strip, one of the jaws of each pair, the jaws 202 in the present instance, are provided with longitudinal ribs 209, and in the other jaws are formed corresponding grooves to receive them, this rib and groove formation of the engaging faces of the grippers acting to crimp the fabric strip and thereby secure a firm hold thereon. While the stop bar 207 limits the movements of the grippers toward closed position and serves to properly locate the closed grippers in a plane substantially perpendicular to the axis of the shaft 198, the grippers may be opened, against the action of the springs 208, by appropriate means. For the purpose of opening the grippers, they are provided with tail pieces 210 and 211, the tail pieces 210 forming continuations of the grippers 202 and the tail pieces 211 forming continuations of the grippers 205. Movement of the tail pieces of each pair of grippers toward one another will thus serve to open the respective grippers. By mounting the grippers for individual rotation and providing them with individual springs and tail pieces, the grippers will be individually operative. The faces of the grippers, when closed, will lie in a plane beyond and perpendicular to the axis of the shaft 198, and the axis of the shaft 198 is preferably located approximately centrally between the pairs of grippers and midway of the lengths thereof, so that rotation of the shaft 198 will produce a rotative movement of the grippers about a substantially centrally located axis.

The grippers are individually guided to travel or circulate within the machine so as to grip the fabric strip and advance it and to subsequently carry the severed bag lengths or sections into operative relationship with the sewing and other mechanisms of the machine and to manipulate the bag lengths to enable various operations to be performed thereon. Preferably, and as shown, a pair of guide rails 212 are provided which extend in parallelism longitudinally of the machine, these guide rails having their inner edges spaced apart to receive between them and to guide ribs 213 which extend downwardly from the under side of each block 197, as is shown in Fig. 10, the upper portion of the block overlying and resting on the respective rails. Above the rails 212 are mounted a pair of rails 214 which are parallel with each other and with the rails 212, the rails 214 engaging in a recess 215 formed in the top of the block 197. These rails 214 serve to hold the blocks 197 of the gripper units in proper sliding relation with the rails 212 and to assist the latter in maintaining the shafts 198 of the gripper units perpendicular to the length of said rails. In order to minimize friction between the rails 214 and the block 197 and to sustain side thrust of the block relatively to the rails, the block is provided with rollers 216 which closely fit into the space between the inner sides of the rails 214, these rollers sustaining the block 197 against lateral displacement, due to side thrust. The pivot screw for one of these rollers has a head 217 which projects above its respective roller for a purpose which will hereinafter appear.

During the advance of the gripper units along the rails 212, the grippers successively occupy different positions about the axis of the shaft 198. The means provided in the present instance for rotating the grippers into the different positions and for holding them in such positions during the advance of the gripper units comprises a Geneva plate 218 fixed on the end of the shaft 198 of each gripper unit, this Geneva plate being square or four sided in outline and formed with a set of four slots 219 which extends inwardly diagonally from the corners toward the center of the plate. The Geneva plates of the gripper units are arranged to travel longitudinally of and with one or another of their flat sides in engagement with a controlling bar 220 which is fixed to the frame of the machine so that it extends parallel to and along side of one of the rails 212. While a gripper unit is travelling along the rails 212 with a flat side of its Geneva plate in engagement with the bar 220, the shaft 198 of such unit will be locked against rotation on its axis and hence the grippers of such unit will be maintained in a fixed angular position. However, after a bag section has been severed from the fabric strip, such bag section, which is held by a gripper, is rotated through a quarter revolution to bring one of its ends or severed edges into position to be sewed, and this quarter revolution of the grippers is produced by a pin 221 which is fixed along side of the bar 220 at an appropriate point in its length, and the upper side of the bar 220 is recessed as at 222 to accommodate the corner of the Geneva plate 218 during rotation thereof.

When the Geneva plate of a gripper unit reaches the pin 221 which projects laterally above the surface of the bar 220, the pin 221 will enter the lower forward diagonal slot 219 in the Geneva plate, and as the gripper unit continues its advance, the Geneva plate and the shaft 198 to which it is fixed will be caused to rotate through a quarter revolution, and during the continued advance of the gripper unit, another flat face of the Geneva plate will bear on the bar 220, thereby locking the shaft 198 and the grippers attached thereto in the new position into which they have been rotated. Further on in the advance of the gripper units, the grippers are successively rotated through two quarter revolutions to bring the remaining ends or severed edges of the bag sections carried by them into position for sewing thereof, and these quarter revolutions are imparted to the grippers by pins 223 and 224 which are arranged in close relationship to one another along the length of the bar 220 and project laterally therefrom into the path of the appropriate diagonal slots 219 in the Geneva plates carried by the gripper units, the upper face of the bar 220 being formed with recesses 225 and 226 to provide clearances for the corners of the Geneva plates while they are being rotated by the pins 223 and 224. During the advance of the gripper units incident to the sewing of the remaining severed edges thereof and the attaching of a tag thereto, the grippers are locked against rotation by the riding of a flat side of each Geneva plate on the top of the bar 220. Each Geneva plate has a roller 227 journalled thereon and projecting laterally from its face at a point midway between two of its opposite sides, for a purpose which will hereinafter appear. The shaft 198 of each gripper unit, at opposite sides of the block or slide 197, is preferably provided with pairs of rollers 228 which are loosely revoluble thereon, and these rollers may be of a diameter to travel on the rails 212 and thus sustain the weight of the respective gripper units.

The conveyor means for advancing the gripper units longitudinally on the rails 212 comprises preferably a screw 229 which is shown clearly in Figs. 2, 5 and 6. This screw comprises a cylindrical body formed with a helical groove 230, and the block or slide 197 of each gripper unit is provided with a roller 231 which is adapted to fit and travel along the length of the groove in the screw when the latter is revolved, in consequence of which the gripper units are caused to advance along the rails 212. The pitch of the groove 230 is constant through that portion of the length of the screw which corresponds to the travel of the grippers while they are engaged with the continuous or unsevered fabric strip, but the portion of the groove in that part of the screw which causes the grippers to travel during stitching or sewing of the second severed edge of the bag section and extending the sewing thread to attach a tag to the bag preferably has an increased pitch in order to advance each bag section at a more rapid speed than that of the next following bag section. As shown in Fig. 5, the portion $a$ in the length of the screw 229 corresponds with the range of travel of the gripper units while they are engaged with the continuous or unsevered fabric strip. The portion $b$ of the screw corresponds with the range of travel of the grippers while advancing the severed bag section for the first end sewing operation thereon and $c$ represents the portion of the length of the screw which corresponds with the travel of the gripper units during the final end sewing operation and the attaching of the tags. However, a screw $229^a$ such as that shown in Fig. 58 may be employed in place of the screw 229, the portion $b'$ of the length of the screw $229^a$ which corresponds with the travel of the grippers immediately prior to and during the first end sewing operation having an increased pitch over that of the portion $a'$ of the screw in order to cause the gripper units to travel at an increased speed prior to the first quarter revolution of the severed bag sections and thereby separate the severed bag sections sufficiently to provide clearance between the bag sections for the quarter rotation which brings the severed end thereof into position for the first end sewing operation and to maintain this clearance between the adjacent severed bag sections to provide sufficient clearance between them while they are being rotated further through two quarter revolutions to bring the other severed edge of each bag section into position for the second end sewing operation. The portion $c'$ of the screw $229^a$ preferably has a further increased pitch over that of the section $b'$ to further separate the adjacent bag sections during the stitching of the tags thereto.

The gripper units circulate or travel through an endless path within the machine, the gripper units returning to the starting position after delivering the finished bags at the discharge point. For this purpose, a second or lower screw 231 having a helical groove 232 similar to the groove 230 of the screw 229 but which may have a constant pitch is mounted opposite to or beneath the screw 229, and sprockets 233 and 234 are provided toward the ends of these screws for the transfer of the gripper units from the screw 229 to the screw 231 and for the return of the gripper units from the screw 231 to the screw 229, and suitable means is provided for guiding or controlling the gripper units while travelling around the sprockets and along the length of the lower screw. The screws are preferably supported at their ends by members 235, through the medium of ball or other anti-friction bearings 236. Preferably shafts 237 extend axially within each screw and have reduced ends 238 on which the inner races of the anti-friction bearings are fitted, these inner races of the anti-friction bearings being locked against shoulders 239 by sleeves 240 which are fitted over the reduced ends 238 and are forced against the inner anti-friction bearing races by the caps 241 and locking screws 242, the latter being threaded into the ends of the shafts.

Different means may be employed for revolving the upper and lower screws to cause the gripper units to travel in opposite directions along the respective screws. In the construction shown, the groove 232 in the lower screw has an opposite pitch to that of the groove 230 in the screw 229 and hence means is provided for revolving both screws continuously in the same direction, in consequence of which the gripper units will travel toward the left in Fig. 5 while engaged by the upper screw 229 and will travel toward the right in that figure while engaged by the lower screw. The driving means, which is shown especially in Figs. 4, 5 and 6, comprises a pinion 243 which is fixed on a shaft 244 and meshes with a gear 245 fixed on a shaft 246, the latter having a pinion 247 thereon which meshes with a pinion 248 fixed on a shaft 248ª and the pinion 248 meshing with pinions 249 and 250 which are fixed on the shafts 251 and 252 respectively. The shafts 251 and 252 have gears 254 and 255 fixed thereon, these latter gears being formed with spur teeth which are arranged helically to conform with the ungrooved portions of the screws 229 and 231, and the ungrooved portions of the screws are formed with gear teeth 256 and 257 to mesh continuously with the helical gear teeth 254 and 255 respectively. As the gears 254 and 255 are revolved in the same direction by the gear 248 which meshes with both of them, the upper and lower screws will be driven continuously in the same direction.

The sprockets 233 and 234 are preferably provided in pairs, as will be clear from Fig. 4, the pair of sprockets 233 being fixed on a shaft 258 at opposite sides of the respective screw supporting member 235 and the shaft 258 having a worm wheel 259 fixed thereon for driving it. Similarly, the pair of sprockets 234 are fixed on a shaft 260 at opposite sides of the respective screw supporting member 235 and the shaft 260 has a worm wheel 261 fixed thereon for driving it. The pairs of sprockets 233 and 234 are of such diameter and are so arranged that the sprockets 233 will receive the gripper members from the upper screw 229 and transfer them to the lower screw 231, and the sprockets 234 will receive the gripper members from the lower screw 231 and transfer them to the upper screw 229. In order to mount the ends of the screws and the sprockets in proper working relation, the screw supporting members 235 are preferably connected to the ends of a bar 262 which extends longitudinally between the screws and is supported on the shafts 258 and 260, and the ends of these shafts are supported in bearings 263 formed in the uprights of the frame 18. The shafts 258 and 260 are driven at a proper speed in relation to that of the screws by worms 264 and 265 fixed on the shaft 244 and meshing with the respective worm wheel 259 and 261.

The pair of sprockets 233 are provided with notches or recesses 233ª spaced at suitable intervals around their circumferences, the notches in one sprocket being opposite to those in the other sprocket of this pair, and the sprockets 234 are formed with similar notches or recesses 234ª, the notches in these sprockets being directly opposite to one another. These notches in the sprockets are adapted to receive the rollers 228 on the gripper units and to thus advance the gripper units while passing around them. While the gripper units are passing around the sprockets 233, they are retained on these sprockets by rails 266 which form in effect curved continuations of the longitudinal upper rails 214, the rails 266 being concentric with the sprocket 233 and arranged to engage the outer sides of the blocks 197 of the gripper units, while the inner straight sides of the Geneva plates bear on a suitably curved track 267 which is a continuation of the bar 220, thereby preventing rotation of the gripper units on their shafts 198 during their travel around these sprockets. The sprockets 234 are provided with similar curved rails 268 which are concentric with said sprockets and form substantially continuations of the top rails 214 so that they will engage the outer sides of the blocks 197 of the gripper units and thereby hold the latter in engagement with these sprockets while travelling around them. A curved bar 269 fixed to the adjacent portion of the frame 18 is provided with a groove 270 in its inner side which is concentric with the sprockets 234, and this groove is adapted for the travel therein of the rollers 227 which project from the faces of the Geneva plates of the different gripper units, these rollers at this time being located at the forward or leading sides of the Geneva plates so that the engagement of these rollers in the guide groove 270 will prevent rotation of the gripper units about their shafts 198 while they are travelling around the sprockets 234. During the travel of the gripper units along the under side of the lower screw 231 they are supported by a pair of longitudinal rails 271 which are similar to the top rails 214 and provide a supporting track for the blocks 197 of the gripper units, and during the travel of the latter along the lower screw they are maintained in proper working relation therewith by a pair of rails 272 which correspond with the upper rails 212 but which are located below the lower screw. Also, rotation of the gripper units while travelling beneath the lower screw 231 is prevented by a bar 273 which extends in parallelism with the rails 271 and 272 and correspond with the upper bar 220, the bar 273 being arranged to engage flat sides of the Geneva plates of the gripper units and thereby prevent rotation thereof about their shafts 198. It will be understood that the rails 212 and 214 and 271 and 272 are fixed to the frame 18 or otherwise supported immovably, and that the bars 220 and 273 are fixed to the frame 18 or otherwise mounted in fixed relation to said rails, these bars forming the upper and lower stretches of an endless track around which the gripper units may travel, the bends in the track being formed by the relatively fixed curved bars or rails 266 and 268 which are mounted on the frame 18 or otherwise supported in relatively fixed positions and form continuations of the upper and lower stretches of the track.

The conveyer screws and the supporting and guiding rails for the gripper units extend longitudinally of the machine, and the various mechanisms which operate upon the fabric strip and upon the bag sections cut therefrom to make up the filled finished bags and to attach tags thereto are located at appropriate points along the length of the conveyer structure.

The filling pocket 16, which receives the weighed charges of tea successively from the weighing devices, through the medium of the chute 20, is located directly above the shaft 260 supporting the sprockets 234 so that the pocket will be at the entrance end to the upper screw 229, and the guide 14 which supports and directs the bottom of the folded fabric strip extends inwardly toward the filling pocket for a distance sufficient to properly feed and direct the fabric strip. The grippers of the various gripper units, it will be understood, travel along one side of the screws in the same vertical plane in which the fabric strip is fed into the machine, and as each pair of grippers approaches the portion of the fabric strip which straddles the filling pocket, these grippers will be held in open position so that they will pass freely at opposite sides of the pocket and the portion of the fabric strip exteriorly thereof, but as soon as each pair of grippers reaches the inner or discharge end of the filling pocket, such grippers are released and they then close upon the fabric strip, under the influence of the springs acting on the grippers. The opening of the grippers immediately before they reach the filling pocket and the release of the grippers to effect closing thereof are accomplished by a cam 274 which is fixed to a relatively stationary part of the frame 18 and has a slot 275 therein through which the tail pieces 210 and 211 of the grippers are movable longitudinally, the entrance and exit ends of the slot 275 being tapered or bevelled, as is shown in Fig. 4 whereby the tail pieces of the grippers, upon entering the slot, will be pressed relatively toward one another, thereby effecting opening movements of the grippers, and while passing from the expanding exit end of the slot, the tail pieces of the grippers will be allowed to spread, thereby permitting closing of the grippers under the action of their springs. A pair of grippers is shown in open position while passing the filling pocket 16, by the dotted lines in Fig. 21.

As the grippers close upon the fabric strip immediately adjacent to the discharge end of the filling pocket 16, as is shown in Fig. 26, these grippers occupy a position behind the auxiliary grippers 62 which serve to prevent back-flow of tea from the strip toward the filling pocket, and as the conveyer grippers are advancing under the action of the upper screw 229, these grippers will commence to act to advance the fabric strip longitudinally in a direction away from the filling pocket, and their engagement with the auxiliary grippers 62 in front of them will cause the auxiliary grippers to be advanced or swung forwardly until the auxiliary grippers are released from the strip and spread apart sufficiently to swing back toward the filling pocket and past the conveyer grippers, release of the auxiliary grippers being effected by a down stroke of the wedge-like projection 69, as has been hereinbefore described. In order to insure advance of the auxiliary grippers 62 ahead of the conveyer grippers even though the latter grippers may for any reason fail to close upon the fabric strip, one of the auxiliary grippers is provided with a laterally projecting lug 62ª which will be in the path of one of the open conveyer grippers, as is shown in Fig. 27, and this lug will be engaged by the open gripper and the advance of both of the auxiliary grippers 62 is thus insured.

Means is preferably employed to positively insure firm closing of the conveyer grippers upon the fabric strip, such means, shown in Fig. 26, comprising a roller 276 which is freely revoluble on the upper end of a bracket 277 which is bolted or otherwise secured to a relatively fixed part of the stationary frame 18, the periphery of this roller being arranged in the path of the outer side of the grippers 205 so that these grippers will be forced inwardly toward the strip while passing the roller 276. A cam 278 is mounted at the opposite side of the path of the travelling grippers, directly opposite to the roller 276, this cam being fixed to a bracket 279 which is bolted or otherwise secured to the relatively fixed frame 18. The cam 278 is located in the path of the outer edges of the grippers 202 so that as these grippers engage the cam 278 they are forced inwardly toward the fabric strip. The consequent compression exerted upon each pair of travelling grippers as they pass between the roller 276 and cam 278 forces each pair of grippers positively into gripping engagement with the fabric strip. During this stage in the travel of the grippers, the latter are arranged with their free or open ends uppermost, and they are held in that position by the engagement of the Geneva plates 218 with the bar 220.

It will be understood that the cam 36 which actuates the feed blade 22, the packing blade 21 and gate 41 is so shaped and timed that a charge of tea will be deposited into the fabric strip behind one pair of grippers and in advance of the other pair of grippers of each gripper unit, so that the pairs of grippers of each gripper unit will grip the fabric strip at opposite sides of a charge of tea therein. It will also be understood that the auxiliary grippers 62 which serve to prevent back-flow of tea in the strip prior to the engagement of the second pair of grippers therewith, when spread apart and released by the projection 69 will clear not only the pair of grippers of the gripper unit which advance them but will also clear and pass behind the leading pair of grippers of the next following gripper unit, the cam 77 which operates the auxiliary gripper-releasing projection 69 being appropriately shaped and timed to effect this result.

*Strip sewing means.*—The folded fabric strip containing charges of tea at intervals in its length and gripped by the travelling grippers so that the pairs of grippers of each gripper unit engage the strip at opposite sides of a charge of tea, is advanced continuously by the grippers in a longitudinal direction and the next operation closes the free upper longitudinal edges of the strip. This operation is preferably performed by a sewing machine 280 which may be of any suitable type and is mounted on the frame of the machine so that it will stitch or sew the uppermost longitudinal edge of the strip while the latter is advanced continuously by the travelling grippers. While sewing machines of different well known types may be used, it is preferable to use a sewing machine such as that shown in Figs. 30, 31 and 32, wherein 281 represents the casing of the sewing machine which may be removably secured in position in the relatively fixed frame 18 by a clamping or locking screw 282 and 283 represents the main shaft which operates the needle bar 284 and the looper and other mechanisms, the construction of which is well known to those skilled in the art and requires no detailed description. It may be pointed out for the present purposes that the plate 285 and the presser foot 286 between which the upper edge of the strip to be sewed passes are arranged vertically to conform with the vertical position of the strip as it passes through the machine, and in order to facilitate threading of the needle 287 and to otherwise render accessible for inspection or adjustment the parts of the sewing machine in the vicinity of the presser foot, the latter is preferably fixed to an arm 288 which in turn is fixed to a rock shaft 289, the latter being off-set from the presser foot and supported by bearings 290 at a side of the sewing machine casing. The presser foot and stitching mechanism, it will be understood are located at the lower end of the sewing machine when the latter is mounted in the machine, and the spring which presses the presser foot against the usual feeding devices contained within the plate 285, and the regulating means for said spring are preferably located at the top or upper end of the sewing machine. As shown, an arm 291 is fixed to the upper end of the rock shaft 289 and it is acted on by a compressed spring 292 one end of which bears on the arm 291 and the other end of which rests against an adjacent nut 293 threaded on a rod 294, the latter being threaded or otherwise secured in the casing 281, as is shown in Fig. 31. The spring 292 acts on the arm 291 in a direction to force the presser foot 286 against the fabric feeding through the sewing machine.

In order to limit the rotation of the shaft 289 in a direction which will carry the presser foot away from the plate 285, an arm 295 is preferably fixed to the shaft 289 and is provided with a set screw 296 which is arranged to bear against the adjacent side of the sewing machine casing 281. 297 represents the tensioning means for the needle thread which may be supplied from a bobbin 298 located at a side of the machine, the thread being guided to the sewing machine over a guide bar 299, and the looper thread may be also supplied from a similar source and guided to the sewing machine over the guide bar 299. While sewing machines which produce different kinds of stitches may be employed, it is generally preferable to use a sewing machine of the over-seaming type. The sewing machine 280 closes the upper free edges of the strip $x$ by stitching it longitudinally, as indicated at $x'$ in Fig. 59, while the strip containing the charges is advanced continuously in a longitudinal direction by the travelling grippers.

*Strip severing means.*—After the fabric strip has been stitched or sewed along its upper longitudinal edge, it is severed to form bag sections or lengths, each bag section or length being held by one of the gripper units which serves to advance such bag section through the machine and to manipulate it for the performance of the subsequent operations thereon. The severing means preferably performs its severing operations upon the strip while the latter travels continuously, thus avoiding the necessity of stopping the strip for severing purposes.

The strip severing means and its operating mechanism are shown in Figs. 2, 3, 6 and 7. As shown in Fig. 7, the severing means comprises a pair of rotary knives 300 and 301 which are revoluble past one another in opposite directions, the operative edges of the knives being bevelled or sharpened as indicated at 302 in Fig. 8, so that they will have a scissors-like action when these edges of the knives pass one another during the rotation of the knives in opposite directions. The knife 300 is fixed to a collar 303, the collar in turn being fixed on a shaft 304. The shaft 304 is mounted to revolve and to also shift axially in bearings 305 which are mounted in brackets 306 which are fixed to suitable parts of the stationary frame 18. The knife 301 is fixed to a sleeve 307 which in turn is fixed within a driving pinion 308, the sleeve 307 being loosely mounted on the shaft 304. Adjacent to the pinion 308 is mounted a pinion 309 which is keyed or otherwise fixed immovably on the shaft 304. A compression spring 310 is interposed between the fixed pinion 309 on the shaft 304 and the adjacent end of the sleeve 307, the expansive tendency of the spring tending to force the shaft 304 toward the right in Fig. 7 and to force the sleeve 307 toward the left in that figure, in consequence of which the knives 300 and 301 are yieldingly pressed against one another so that their contacting faces are maintained in engagement with one another like the plates of a pair of scissors. The shaft 304 and sleeve 307 are revolved simultaneously in opposite directions by their pinions 309 and 308 respectively, and an anti-friction thrust bearing 311 is preferably interposed between the sleeve 307 and the spring 310 in order to minimize friction at this point.

The pinions 308 and 309 are driven simultaneously in reverse directions from a gear 312 which meshes directly with the pinion 308 to drive it in one direction and meshes with an intermediate pinion 313 which is fixed on a relatively fixed counter-shaft 314, the latter having a pinion 315 fixed thereon which meshes with the pinion 309 and acts to drive it in a direction opposite to that in which the pinion 308 is driven. The arrangement is such that the knives 300 and 301 are driven at equal speed but in reverse directions and so that the sharpened or working edges of the cutters will pass one another as they pass the plane of the fabric strip which lies in the same vertical plane with the shaft 304. While the cutters are revolving simultaneously in opposite directions they are shifted axially by a cam 316 which is fixed on the shaft 304 and has a groove 317 therein which receives a roller 318 which may be mounted on one of the stationary brackets 306. The cam groove 317 is so shaped and positioned that it causes the shaft 304 and the cutters carried by it to reciprocate axially forwardly and rearwardly in a direction longitudinally of the fabric strip, the forward reciprocations of the cutters taking place in unison with the forward travel of the fabric strip during which reciprocation the cutting edges of the cutters act on the fabric strip to sever it and the rearward reciprocation of the cutters taking place while the next following bag length or section of the strip is being advanced past the gears. The cutters are so timed that they will sever the fabric strip on lines located midway between the gripper units, as is illustrated diagrammatically in Fig. 64. The pinions 308 and 309 are elongated axially in order that they may remain in mesh with the gear 312 and the pinion 315 respectively throughout the range of reciprocation of the pinions, thus maintaining the knives or cutters in driving connection with their driving means. The gear 312 which drives the strip cutting off knives or cutters is driven from a pinion 318 which is fixed on a shaft 319 which extends longitudinally of the machine and is mounted in suitable bearings on a side of the frame 18, and the shaft 319 is driven continuously from the shaft 246 by a chain 320 which engages a sprocket 321 fixed on the shaft 246 and a sprocket 322 which is fixed on the shaft 319. Means (Figs. 52 and 53) is provided for adjustably mounting the gear 318 which drives the severing knives 300 and 301 on the shaft 319 to enable timing of these severing knives, the shaft having flanges 323 and 324 thereon, the flange 323 being keyed on the shaft and the flange 324 being rotatable thereon and coupled to the gear 318 by a jaw clutch 324ª, and one of these flanges has segmental or circumferentially elongated slots 325 therein to receive locking screws 326 which are threaded into holes 327 in the other flange, this arrangement enabling the flanges to be clamped in proper angular relation to one another to time the cutter 318 and the severing mechanisms driven therefrom with respect to the shaft 319.

*First end sewing mechanism.*—As each gripper unit advances further after the bag length or section carried by it has been severed from the remainder of the fabric strip, the Geneva plate 218 of such unit engages the pin 221 which overlies the bar 220 and in consequence, the shaft 198 of this gripper unit is rotated through a quarter revolution, thereby bringing an end or severed edge of the bag section into uppermost horizontal position, and the grippers of this unit are maintained in such position by the engagement of a flat side of the Geneva plate of this unit with the top of the bar 220. While this bag section is being advanced in that position, its top edge is introduced into a sewing machine 328 which may be similar to the sewing machine 280 already described, this second sewing machine operating to stitch or sew the upturned end of the bag section as indicated at $x^2$ in Fig. 60.

In order to insure the proper entry of the top edge of the bag section into the sewing machine 328, a curved tucker or finger 329 is provided, this tucker or finger being fixed to an arm 330 which is pivoted at 331 to one of the top rails 214 and is provided with a spring 332 which acts to yieldingly force the point or end of the tucker toward the passageway behind the presser foot of this sewing machine and at the same time to grip the fabric bag section between it and the plate 285 and to force the edge of the bag section behind the presser foot. The tucker or finger 329 is normally held in retracted position as shown in Fig. 34 by a pair of the upwardly projecting screw heads 217 on adjacent gripper units which ride along a flange 333 which is fixed to the under side of the arm 330, but the intermediate of this flange 333 is formed with a recessed or cut-away portion 334 which will receive the screw head 217 on the gripper unit which has advanced a bag section to this sewing machine while at the same time the screw head 217 on the gripper unit in advance thereof has passed beyond the flange 333, the spring 332 then acting to swing the tucker or finger 329 toward the presser foot of the sewing machine and carrying the top edge of the bag section adjacent thereto behind the presser foot. The operating stroke of the tucker may be limited by a second flange 335 which projects downwardly from the under side of the arm 330 and is arranged to abut against the outer side of one of the rails 214 when the tucker has reached the limit of its operating stroke.

The sewing machine 328 operates continuously upon the bag sections whose upturned edges are advanced continuously past it, and the stitch formed by this sewing machine extends from one bag section to the other. Means is provided for severing these threads connecting adjacent bag sections in order that the bag sections may be relatively rotated to enable the subsequent operations to be performed thereon. The severing means employed for this purpose is shown in Figs. 49, 50 and 51. It comprises a bracket 336 which is bolted or otherwise fixed to a side of the frame 18 and has a shaft 337 mounted therein with its axis arranged longitudinally of the direction of advance of the bag sections. The shaft 337 is revolved continuously in the direction indicated by the arrow in Fig. 49 by a train of gears 338, 339, 340 and 341, the gear 341 being fixed on the shaft 319. At one side of the bracket 336 is mounted a casing 342, and to the other side of this casing is applied a plate 343 which has a notch 344 in its lower edge to permit passage of the top edges of the bag sections as they pass beneath the casing 342 and to receive the sewing thread which connects the adjacent bag sections, an edge 345 of this notch being sharpened to form a severing edge. A cutter 346 is fixed to the shaft 337 and revolves therewith in close relationship with the plate 343, the forward edge of the cutter being sharpened so that when it engages the sewing thread extending between adjacent bag sections it will shear such thread against the relatively fixed edge 345 on the plate 343. Fig. 51 shows the sewing thread immediately after it has been severed by the cutter 346. In order to enable the relatively fixed severing edge 345 to be properly located or re-located after re-sharpening, the plate 343 is rotatable on the casing 342 about the shaft 337 as an axis, and the plate is provided with a number of circumferentially spaced openings 347 the appropriate one of which may be engaged with a locking pin 348 which projects laterally from the side of the casing. Means is provided for trimming off the ends of the sewing thread which remain attached to the corners of the bag sections after the sewing thread has been severed. Such means comprises a knife 349 which is adjustably secured to the inner side of the bottom of the casing 342, by the clamping screw 350, the end 351 of this knife being sharpened to form a cutting edge, and this cutting edge of the knife is located immediately above a slot 352 which is formed in the bottom of the casing 342 above the path of travel of the sewed tops of the bag sections as they travel beneath the casing.

A circular disk 356 is fixed on the shaft 337 so that it will revolve therewith, and this revoluble disk carries a pair of blades 357 and 358 which extend radially of the disk and have their outer edges arranged to terminate flush with the circumferential edge of the disk 356, the plates preferably having tongues 359 thereon which engage in notches 359' in the circumference of the disk to assist in rigidly supporting the blades on the disk. The circular circumferential edge of the disk 356 rides on the knife 349 at or near its cutting edge 351, the knife being maintained in contact with the disk by the inherent resilience of the material of which the knife is composed, and as the outer edges of the blades 357 and 358 are flush with the circumference of the disk 356 these edges of the blades will wipe over the cutting edge 351 of the knife 349. The interior of the casing 342 is connected through a pipe 360 to an exhaust line or pump (not shown) so that a partial vacuum is maintained within the casing. The effect of the partial vacuum within the casing is to suck the end of the sewing thread attached to the leading bag section upwardly through the slot 352 into a position close to the cutting edge 351 of the knife 349, and as the blade 357 on the revolving disk 356 wipes past the cutting edge 351, it severs this end of the sewing thread close to the corner of the leading bag section. As the advance of the bag sections continues, the severed sewing thread attached to the corner of the following bag section is brought into a position beneath the slot 352 and is drawn by the suction upwardly through said slot into a position in front of the severing edge 351 of the knife 349 and into the path of the second blade 358 on the revolving disk, and as this blade wipes past the severing edge 351 it trims off the sewing thread close to the corner of the respective bag section.

The exterior revolving cutter 346 and the cooperating plate 343 are preferably pressed yieldingly against one another in order to insure efficient severing of the thread by their cutting edges, by an expansion spring 361 which may be housed within a boss 362 secured within the casing 342 at the inner side of the wall of the casing adjacent to the plate 343, one end of the spring bearing against the plate 343 and its opposite end bearing against the bottom of the boss 362 which is secured to the side wall of the casing 342. The plate 343 is capable of moving for a limited distance toward the right in Fig. 51 relative to the casing 342, and the spring 361 will impose a thrust on the plate 343 which will yieldingly press the plate 343 against the revolving cutter 346.

*Second end sewing means.*—After the sewing thread connecting the first sewed ends of the bag sections has been severed and the ends thereof trimmed off, the further advance of the bag sections by the travelling gripper units brings the Geneva plates thereof successively into cooperation with the pins 223 and 224, and these pins act on the Geneva plates to impart two successive quarter revolutions to the grippers about their respective shafts 198, whereby each gripper and the bag section carried thereby is rotated from the position shown in Fig. 60 to the reverse or diametrically opposite position shown in Fig. 61, and as the gripper units continue to advance beyond the pins 223 and 224, they are locked against rotation by the engagement of their Geneva plates with the bar 220. This second end sewing operation is performed by a sewing machine 363 which is alined with and may be similar in construction to that of the sewing machines 280 and 328, this sewing machine being removably held in fixed position on a side of the stationary frame 18 by a clamp screw 282. Also, this sewing machine is preferably provided with a tucker 329$^a$ the construction, operation and control of which may be similar to that of the tucker 329 for the second end sewing machine 328, which has been already described, this tucker serving to insure entrance of the leading corner of the upturned edge of each bag section behind the presser foot of this sewing machine. The stitching produced by this sewing machine is indicated at $x^3$ in Fig. 61.

The sewing machines 280, 328 and 363 may be driven by pinions 364, 365 and 366 fixed on the upper ends of their main shafts, these pinions meshing with driving gears 367, 368, and 369 respectively. The ratio of the pinions 364 and 365 to their driving gears 367 and 368 respectively is preferably equal, but the ratio between the pinion 366 and its gear 369 is preferably higher so that the sewing machine 363 will operate at a somewhat higher speed than that of the sewing machine 280 and 328, for a purpose which will presently appear. The shafts 370, 371 and 372 to which the sewing machine drive gears are fixed are suitably mounted in relatively fixed bearings in the frame 18 and above the bed, and they are provided at their lower ends with pinions 373, 374 and 375 which mesh with drive gears 376, 377 and 378 respectively which are keyed or otherwise fixed on the continuously revolving shaft 244.

*Tag feeding and positioning means.*—It is desirable or preferable to attach a tag containing advertising matter or identification means to each tea bag or cartridge, and the machine shown in the present instance is provided with means for attaching such tags to the bags by continuations or extensions of the sewing threads used to effect the second end closing operation. For example, as shown in Figs. 61 and 62, T represents a cardboard or paper tag and these figures illustrate diagrammatically the manner in which the tag is attached to its respective bag by a continuation or extension of the sewing thread or stitching $x^3$, the extended thread after leaving one bag being stitched through a corner of the tag, and after bridging the space between adjacent bags it stitches the end or uppermost edge of the next adjacent or following bag. During the stitching of the thread between the adjacent bags, the bag in the lead is advanced at an accelerated speed as the result of the operation of the portion $c$ of the screw 229, which has a relatively increased pitch, upon the gripper unit carrying such bag section. This accelerated motion is imparted to the leading bag section immediately before it reaches the last sewing machine 363 and it causes such bag section to draw away from the adjacent following bag section and the increased speed at which the bag section is then and subsequently advanced provides sufficient spacing between the bag sections for the formation of a stitched thread of sufficient length for the attachment of the tag to the bag. The relatively increased speed of operation of the sewing machine 363 is for the purpose of compensating for the increased speed of each bag section after it reaches a predetermined point in its travel.

The tag feeding means comprises in the present instance a magazine 379 which may be composed of a trough-like open topped receptacle arranged to be supported in an inclined position on top of the machine by a bracket 380 and is adapted to contain a supply of tags adapted to feed toward the inner or discharge end of the magazine by gravity, the magazine being supported in an inclined position to effect such feed. It is preferable to form or print the tags in strips each containing a number of the tags, the strips of tags each of which contains five tags in the present instance being illustrated in Fig. 44. The tags composing the strip are partially severed by transverse cuts $t$ which extend inwardly from the opposite longitudinal edges of the strip, and the opposite longitudinal edges of each tag are inclined as at $t'$ and $t^2$, Fig. 44, the corner between the edge $t^2$ and the adjacent cut $t$ being rounded or cut away so that the top edge of each tag presents exposed edges $t^3$ which are adjacent to the respective longitudinal edges of the strip. The strips of tags are stacked in the magazine 379 so that they stand in upright position with the face of one strip against the back of the strip in front of it, and the lower edges of the strips rest on the inclined bottom of the magazine. The forward pressure exerted on the tag strips and which tends to discharge them from the lower end of the magazine is sustained by a plate 381 which extends vertically at the discharge end of the magazine and is somewhat narrower than the width of the magazine so that the edges $t^3$ of the tags will be exposed at the opposite vertical edges of this plate. The plate 381 is firmly supported in fixed position by upper and lower brackets 382 and 383 which are attached to the plate at the side thereof opposite to that which engages and sustains the thrust of the tag strips. The brackets 382 and 383 are supported rigidly by a plate 384 which is secured rigidly to a side of the magazine.

The bottom 385 of the magazine extends into proximity to the plate 381 at a point approximately midway of the height of this plate, and a plate 386 extends downwardly from the lower end of the magazine bottom into parallelism with but spaced from the plate 381 for a distance sufficient to permit the descent of a tag strip between these plates. At that junction of the plate 386 with the lower end of the magazine bottom 385 is provided a finger 387 which may be fixed at its lower end to the plate 386 and projects upwardly from its upper end so that it will lie in a position adjacent to the bevelled inclined edge $t'$ of the lowermost tag in the foremost tag strip in the magazine and will be behind this edge of the tag while it is being fed downwardly thereby backing up the tag strip and maintaining it in engagement with the feeding devices hereinafter described. To the member 384 is secured a plate 388 the upper end or corner of which projects upwardly above the bottom of the magazine in a position to overlap the lower corner of the side $t^2$ of the lowermost tag in the strip. The upper end of the plate 386 is provided with an upwardly projecting thin lip $386^a$ which serves to sustain the forward pressure acting on the lower end of the foremost tag strip and prevent forcing of the lower end of the foremost tag prematurely into the vertical space between the plates 381 and 386.

Means is provided for feeding the foremost tag strip against the lip $386^a$ and for separating the foremost tag strip from the next following tag strip in the magazine in order that the foremost tag strip in the magazine may, at the proper time, be fed from the magazine and enter the passageway in front of the plate 386. Such means as shown in Fig. 36 comprises a plate 389 which is mounted to reciprocate in the magazine bottom 385 below the tag supporting surface thereof, the lower forward edge of this plate, the angle formed by the junction of the magazine bottom 385 and the plate 386, being bevelled as at 390 so that when the plate 389 moves forwardly its bevelled edge 390 will engage the bottom edge of the foremost tag strip in the magazine and will push this tag strip against the lip $386^a$ and separates it from the following tag strip in the magazine. The plate 389 may be reciprocated periodically by a rocker 391 which is fixed to a shaft 392, the latter being mounted in relatively fixed bearing brackets 393, the upper end of the rocker being forked and engaging a stud 394 which is fixed to the plate 389, and the shaft 392 has an arm 395 fixed to it, said arm being connected by a link 396 to a lever 397, the latter being mounted to swing vertically on a relatively fixed shaft 398. The means for actuating the arm 397 to reciprocate the plate 389 will be later described.

The shaft 398 has an arm $398^a$ fixed thereon, said arm having a lip $398^b$ thereon which occupies a position at the top of the passageway through which the tag strips are fed downwardly, this lip being arranged to engage the upper edge of the foremost tag strip in the magazine and preventing it from feeding forwardly until the plate 389 is moved forwardly whereupon, this lip is lifted, thus permitting the top of this tag strip to move into position beneath it and to assume a position beneath a pin $398^c$ which is fixed to the upper end of the plate 381 and serves to present upward displacement of the tag strip during the upward reciprocating movement of the mechanism which feeds the tag strip downwardly, as will be hereinafter described.

The member 388 has a downwardly extending relatively resilient portion 399 which is spaced from the adjacent edge of the plate 381, and this portion 399 overlies the edges $t^2$ of the tags and thus assists in guiding the tag strip during its descent through the passageway between the plates 381 and 386. The lower end of the member 399 is formed with an inclined edge 400 which conforms with the angle of the inclined edges $t^3$ of the tags, and the upper end of this inclined edge 400 terminates in a horizontal shoulder 401 which is in a position to engage the adjacent top edge $t^3$ of a tag should the same tend to rise or feed backward. During descent of the tag strip, the edges $t^2$ of the tags pass behind the member 399 and these portions of the tags are thus confined against displacement but when a tag reaches a point in its descent where its inclined edge $t^2$ registers with the inclined edge 400 of the member 399, the edge $t^2$ of that tag will be released and the lower end of the member 399 will spring back under its inherent resilience so that the edge 400 thereon lies in the same plane with and abuts against the inclined edge $t^2$ of the tag. The member 399 at this time will prevent upward or retrograde motion of the tag engaging its edge 400. To further assist in preventing upward or retrograde motion of a tag or of the strip of which it is a part, a spring finger 402 may be employed, this finger being shown fixed at its upper end to the plate 381 and having its free lower end arranged in the path of the left hand edges $t^3$ of the tags, as shown in Fig. 44. The lower end of this finger has an inherent tendency to move rearwardly or toward the plate 386 so that during descent of the tags they will ride past the lower end of this finger, but as the left hand edge $t^3$ of each tag passes the lower end of the finger 402, the latter will move into position above said edge and it will lock the tag beneath it or the strip of which such tag is a part from upward or retrograde motion.

In order to assist in holding the lowermost tag ready for discharge in proper position until it is removed from the bottom of the passageway between the plates 381 and 386, especially when this tag is the last one in the strip, a pair of springs 403 are provided, these springs being riveted or otherwise secured at their upper ends to the forward side of the plate 381 and having portions 404 which are curved or off-set so that they extend through slots 405 in the plate 381 and are in sufficient proximity to the plate 387 to frictionally engage the faces of the tags as the latter are brought into position behind them. The pressure of these springs is sufficiently light to avoid interference with the positive downward feed of the tags but the pressure which these fingers apply to each tag is sufficient to prevent twisting or premature dropping of the tag.

Means is provided for feeding the tag strips delivered from the magazine, through the passageway behind the plate 381. Such means comprises preferably two pairs of pawls, one pair arranged above the other and both pairs of pawls being carried by a vertically reciprocable slide 406 which operates within a guide 407, the latter being secured to the tag delivery end of the magazine with the pairs of pawls positioned to cooperate with the tag strips behind the plate 381. The lower pair pawls 408 are individually pivoted on a pivot pin 409, these pawls being spaced laterally so that they straddle the lower portion of the plate 381 and will engage the exposed edges $t^3$ of the tags. Springs 410 act on the respective pawls to individually hold the spurs 411 thereon against the tag strip and to move these spurs into position to engage successively the edges $t^3$ of the advance tags in each strip. The movement of the lower ends of these pawls, under the action of the springs 410, is limited by the tail pieces 412 of the pawls which are arranged to abut against a limit bar 413 which is fixed to the slide 406 and carries the pivot 409. The upper pawls are similar to the lower pawls just described, the upper pawls however being positioned to operate upon the lowermost tag of a tag strip immediately after it has been fed from the magazine and to feed such tag strip downwardly until it is operated on by the lower feed pawls, the lower feed pawls being positioned sufficiently low to advance the last tag in each strip to its lowermost position preceding its removal from the feeding mechanism.

The slide 406 reciprocates the feeding pawls a vertical distance slightly greater than the vertical height of an individual tag so that these pawls will engage the edges $t^3$ of successive tags in each strip as the result of successive reciprocations of the slide. The slide is reciprocated by a link 414 which is pivotally connected to the slide at 415' and is operatively connected to one end of a rocker 415 which is pivoted at 416 to a relatively fixed bracket 417, the other end of this rocker having a roller or projection 418 which operates in an appropriately formed groove 419 of a cam 420.

The tag strips are fed by the feeding pawls so that one tag strip follows directly behind the other, there being no gap between the strips. In order to accomplish this, a tag strip is removed from the magazine as soon as the upper end of the preceding tag strip has reached the bottom of the foremost tag strip in the magazine, the upper feed pawls being then able to act upon the lowermost tag in the foremost tag strip in the magazine. Each tag strip is fed from the magazine by a suction cup 421 attached to the end of a tube 422 which extends through an opening 423 in the plate 381 so that the suction cup is positioned directly opposite to the lowermost tag in the strip which rests on the bottom of the magazine and against the lip 386$^a$. The tube 422 is reciprocable, it being guided by the plate 381 and by a bracket 424 so that the suction cup may move forwardly against the face of the lowermost tag in the foremost tag strip in the magazine while suction is applied to the tube 422 which will cause the suction cup to adhere to such tag. Prior to the engagement of the suction cup with the tag, the plate 389 is reciprocated forwardly, its inclined edge 390 acting on the lower end of the tag strip to feed it forwardly to free this tag strip from the next following tag strip and to feed it forwardly against the lip 386$^a$. The plate 389 is thus reciprocated by a plunger 425 which is mounted to reciprocate vertically in line with the upper end of the slide 406 so that when the latter moves into its uppermost position it will act on this plunger to raise it, and the upper end of the plunger acts on the arm 397 connected to the plate 389, whereby said plate is advanced to feed the tag strip. While the effective suction is on the tube 422, the latter is retracted, this motion causing the lower edge of the tag strip and which adheres to the suction cup to be drawn forwardly and flexed past the upstanding lip 386$^a$, and the lifting of the arm 398$^a$ allowing the upper edge of the tag strip to pass forwardly beneath it and into position beneath the pin 398$^c$. The tag strip will then be in a position to be engaged by the upper feed pawls 408 on their following descent, whereby this tag strip will be fed downwardly in the vertical passageway between the plates 381 and 386, the lower edge of the upper tag strip abutting against the top edge of the lower or preceding tag strip.

While the upper feed pawls are acting to advance the tag strips which have been removed from the magazine, the pawls are prevented from acting on the foremost tag strip contained in the magazine by the tail pieces 412 on the pawls which limit the inward swing of the pawls so that they do not reach the tag strips contained in the magazine. The tube 422 carrying the suction cup is reciprocated at appropriate intervals by a lever 426 which is pivotally mounted at 427 and is pivotally connected at 428 to the tube, this lever carrying a roller 429 which rides on a cam 430 fixed on the shaft 319, the roller being held in contact with the cam by a spring 431.

The tube 422 is connected through the pipe 432 to a suction line or exhaust pump (not shown) so that the suction on this tube is continuous, but the suction action on the suction cup 421 is effective only periodically under the control of a valve 433 which is connected by a flexible tube 434 to the reciprocatory tube 422 and controls a port open to the atmosphere. The valve 433 embodies a valve plunger 435 which is normally held on its seat or in closed position by a spring 436, and the end 437 of this plunger rests against the end of a slide 438, the latter being reciprocated through a line 439 which is pivotally connected to it and a lever 440 which carries a roller 441 the latter travelling in the appropriately formed groove 442 of a cam 443. The cams 420 and 443 are fixed on a shaft 444, and this shaft is driven at appropriate speed by a chain 445 which is driven from a sprocket 446 fixed on the shaft 319 and drives a sprocket 447 fixed on the shaft 444.

When the valve is closed, a vent 435$^a$ to the atmosphere is closed, and a vacuum will then be produced effectively on the suction cup 421, and when the valve is opened, thus connecting the tube 422 to the atmospheric vent, the suction on the suction cup 421 will be broken causing prompt release of the tag engaged by the suction cup so that it may be advanced by the reciprocatory feeding pawls. The spring 436 acts on the valve to hold the end of its plunger against the adjacent end of the slide 438 and as soon as this slide starts forward under the action of the cam 443, the spring will close the valve and hold it closed until the slide 438 approaches the limit of its return stroke, it then reciprocating the plunger toward the right in Fig. 36 and thereby unseating and opening the valve. The slide is shown at the extreme end of its return or right hand stroke in Fig. 36, the valve at this time being open, but as soon as the slide commences to move toward the left in that figure, the valve closes and it remains closed until the slide 438 approaches the limit of its return stroke.

During the period the valve is closed to establish an effective vacuum in the suction cup, the latter is moved forwardly against the lowermost tag in the foremost tag strip in the magazine and is retracted or shifted toward the right in Fig. 36 under the action of the cam 430, so that if the uppermost tag in the preceding tag strip has been fed below the lowermost tag of the exposed tag strip in the magazine, such tag strip will be withdrawn from the magazine by the vacuum cup which will then engage the lowermost tag of this strip. The breaking of the vacuum causes the suction cup to release this tag strip so that it will then be in a condition to be fed by the reciprocatory pawls 408. The cam 420 which controls the operation of the pawls 408 is so shaped and timed relatively to the cam groove 442 that the slide 438 will be in its retracted position during the downward or tag feeding stroke of the pawls.

The slide 438 is arranged below the magazine and below the plates 381 and 386 between which the tags are fed therefrom, and this slide operates to receive the tags and to transfer them successively to a gripper mechanism which serves to position the tags, one at a time, to be stitched by the sewing machine 363. As shown in Figs. 36 to 40 inclusive, the slide 438 is mounted to reciprocate in a bracket 417, said bracket being fixed to a relatively stationary part of the frame 18, and the link 439 which actuates the slide is connected thereto by a screw or pivot 450. On the upper side of the slide is mounted a knife 451, it being secured to the slide by the screws 452. The cutting edge 453 of this knife is so located that it will be adjacent to the lower end of the passageway between the plates 381 and 386 through which the tags are fed, when the slide is in its retracted position, but the forward stroke of the slide will carry the knife across said passageway and will sever the lowermost tag from the remainder of its strip, on a line which is a continuation of the cuts $t$ between the adjacent tags. The tag prior to severing thereof from its strip, is fed into a position in front of the slide 438, the line on which the tag is to be severed being substantially on a level with the top of the slide, and in order to hold the severed tag in place against the end of the slide 438 during the movement of the latter which brings the tag into position for transfer therefrom, a clamping member 454 is provided, the body portion of this clamping member lying in a recess 455' in a side of the slide 438 so that it may reciprocate to a limited extent longitudinally of the slide, and one end of the clamping member has a head 455 thereon which extends in parallelism with the tag-receiving end of the slide 438, as is shown in Fig. 39. The opposite end of the clamping member has a lug 456, and a compressed spring 457 is interposed between this lug and a screw 458 threaded within the slide 438, this spring acting to yieldingly force the head 455 of the clamping member against the tag-receiving end of the slide.

When the slide 438 is in its fully retracted position, the head 455 of the clamping member is held spaced from the tag-receiving end of the slide so that the lowermost tag in the tag strip may be received freely in the space thus provided in front of the slide 438. For this purpose, the lower edge of the head 455 of the clamping member is formed with a downwardly projecting flange or lug 455ª which is arranged to come against a bracket 459 which is fixed to the stationary bracket 417 by the screws 460, so that when the slide 438 approaches the limit of its return stroke, the flange 455ª on the clamping member will come to rest on the bracket 459 so that the clamping member will be held from further movement while the slide 438 completes its return stroke, the continued return movement of the slide causing its tag-receiving end to separate from the head 455 of the clamping member, as is shown in Fig. 37. Immediately upon the commencement of the tag transferring stroke of the slide 438, the slide 458 moves relatively to the clamping member, the latter being held against the bracket 459 by the spring 457, the end of the slide being thus brought into clamping engagement with the tag in front of it, and as the working stroke of the slide continues, the slide and clamping member will travel in unison, the tag being held frictionally in place between these members under the action of the spring 457.

In order to support and position the tag when it is fed into the space then existing between the slide 438 and the head 455 of the clamping member, a bracket 459 extends beneath the space between the slide and clamping member and in the plane in which the tag strip is fed so that this bracket will form a ledge which will arrest the descent of the tag strip and will properly position the lowermost tag thereof between the slide and the clamping member. For the purpose of preventing buckling of the tag while being fed into the space between the forward end of the slide 438 and the head 455 of the clamping member, a finger 461 is fixed to the relatively stationary bracket 384, it having a space 462 which is immediately in front of a vertical guide 463 along which one edge of the tag descends, the narrow passageway between these elements serving to conduct the tag into the space between the slide 438 and the head 455 of the clamping member and preventing buckling of the tag as it enters such space.

While the slide and cooperating clamping member are approaching the limit of their forward or tag-transferring position, the tag is transferred edgewise therefrom to a gripper which serves to carry the tag into position to be stitched by the sewing machine 363. For this purpose, a corner of the head 455 of the clamping member is recessed, as at 455ᵇ to receive an end of a finger 464, the latter being fixed on a shaft 465 which is pivoted in a bracket 466 secured to the stationary bracket 417, and the shaft 465 has an arm 467 fixed thereon, the upper end of this arm having a bevel 468 which is arranged in the path of movement of a stud or projection 469 which is fixed to the lower portion of the vertically reciprocatory slide 406 which carries the tag feeding pawls 408. A compressed spring 470 interposed between an arm 470' and the stationary bracket 417 acts to move the end of the finger 464 into the notch or recess 455ᵇ of the head 455 of the clamping member and against the edge of the tag clamped frictionally between the clamping member and the end of the slide 438, the spring being of sufficient strength to cause the finger 464 to force the tag edgewise partially out of its position between the clamping member and slide, as shown diagrammatically in Fig. 47, but during the period the slide 438 is advancing to bring the tag into the position shown in Fig. 38 where it will be in the plane of operation of the finger 464, the pin 469 on the slide 406 will be in its lowermost position below the bevelled upper end of the arm 467 so that the finger 464 will be held retracted against the action of its spring 470 and hence the finger will be out of the path of the tag as the latter is brought into position to be transferred.

*Tag positioning means.*—Each tag as it is removed from the slide 438 is received by a gripper which grips the tag and then transfers the tag to a position to be received and stitched across a corner thereof by the sewing machine 363. Such means is shown in Figs. 46, 47 and 48. It comprises pairs of grippers 471 which are spaced circumferentially around a disk or carrier 472, the latter being fixed to a supporting and driving shaft 473. The driving shaft has a gear 474 fixed thereon, this gear meshing with a pinion 475 of appropriate size fixed on the shaft 444. The shaft 444 is driven continuously from the shaft 319, and the pinion 475 consequently revolves the shaft 473 continuously at an appropriate speed determined by the ratio of the gear 474 and pinion 475.

The grippers of each pair are pivotally mounted on a common pivot pin 476 which is secured to the face of the disk 472, and a tensioned spring 477 connects the grippers of each pair and tends to close them. A pin 478 fixed to the disk 472 centrally between the grippers of each pair serves to limit or control the closing movements of the grippers. The tag engaging faces of the grippers are grooved as at 471ª so that they will receive and position the tag in the plane of the grippers, these faces of the grippers being of an outlet to conform with the shape of the edge of the tag.

When each pair of grippers reaches a position about in alinement with a tag held between the slide 438 and the clamping member and which is being advanced by the slide, the grippers are in open position to receive the tag as is indicated in Fig. 47, and at this moment, due to the shape of the cam groove 419, the slide 406 commences its ascent, thereby disengaging the pin 469 thereon from the arm 467 and causing the spring 470 to quickly swing the finger 464 into the notch 455ᵇ, thereby shifting the tag into the open grippers, immediately after which the grippers close to grip the tag and rotation of the disks 472 carries the gripped tag upwardly and forwardly through the stitching mechanism of the sewing machine 363 immediately following which the grippers opened to release the tag.

The means preferably employed for so controlling the operation of the grippers comprises a pair of annular cams 479 and 480, and the grippers of each pair carry rollers 481 and 482 which ride respectively on these cams and are held in contact therewith by the respective springs 477. The cams are so shaped that the grippers of each pair will be held in open position while a tag is being inserted therein, as is shown diagrammatically in Fig. 47, immediately after which the grippers will close and they will be held closed by their respective spring 477 so that the tag is held at its edges in the closed grippers and while the tag is so held it is carried by the rotation of the disk 472 through the stitching mechanism of the sewing machine 363 so that an upper corner of the tag is stitched by a continuation of the stitching $x^3$ which closes the upturned end of the bag, as is illustrated diagrammatically in Fig. 61. The continued rotation of the disk 472 causes the cams 479 and 480 to act on the rollers 481 and 482 to open the grippers at the moment the tag comes into contact with the needle of the sewing machine 363, thereby releasing the tag, and the grippers are held in open position until after they pass the tag receiving position.

Means is preferably employed for relatively rotating the cams 479 and 480 to enable accurate timing of the opening and closing of the grippers to be attained. As shown in Fig. 48, these cams are formed as part of sleeves 483 and 484 respectively, the sleeve 484 fitting closely within the sleeve 483 and having the shaft 473 mounted axially within it. The outer sleeve 483 is fitted closely within a clamp bracket 485 which is attached to the relatively fixed frame of the machine and the ends of the sleeve 483 and 484 beyond the bracket 485 are provided with wrench-receiving holes or notches 486 and 487 respectively whereby the sleeves may be individually rotated to adjust the rotative positions of the cams. The cams may be thus adjusted while they are frictionally held by the clamp like bracket, and after proper adjustment has been attained, they are positively locked by a set screw 488 which is threaded through the bracket 485 and binds or locks the sleeves of the cams.

The thread of the sewing machine 363 which is sewed through the tag is continued and it sews the uppermost end or edge of the next following bag section which is being advanced by the respective travelling gripper, and immediately after the sewing of the next following bag section has commenced, the thread which attaches the tag to one of the adjacent bags is severed, as is shown diagrammatically in Figs. 62 and 63. The severing means employed for this purpose comprises in the present instance a relatively fixed blade 489 which is fixed to a housing 490 which is secured to a side of the stationary frame 18, this blade having a cutting edge 491 which is positioned at one side of the path along which the uppermost edges of the bag sections travel, and a rotating cutter or blade 492 having a cutting edge 493, the cutter 492 revolving against the blade 489 so that its cutting edge 493 cooperates with the stationary cutting edge 491 of the blade 489 to sever the thread which attaches the tag to the bag section immediately ahead of it. The revolving cutter 492 is fixed to a shaft 494 and this shaft is driven from the shaft 319 by a train of gears which are contained in the housing 490 and are similar to the train of gears shown in Fig. 49 for driving the revolving gear 346.

In order to prevent entanglement between the grippers and the tag hanging from the bag section being stitched, after the tag has been detached from the preceding bag section, a guard rail 495 is provided one end of which is arranged substantially beneath the line of travel of the bag sections, as is shown in Figs. 62 and 63 and the other end of which is off-set to the opposite side of the line of travel of the bag sections and beyond the ends of the gripper units, and the shaft 494 which carries the revolving cutter 492 has an arm 496 fixed thereon at a sufficient distance behind the cutter and this arm is arranged to operate in a path so that it will strike the tag immediately after the thread which attaches it to the preceding bag section has been severed and to cast this tag over the guard 495, as is shown in Figs. 62 and 63, and as the advance of the bag sections and tags proceeds, the tags hanging therefrom by their attaching threads will travel along the guard 495 beyond the ends of the gripper units so that they cannot become entangled with the grippers or other parts of such units.

After the thread joining the adjacent bag sections has been severed and the suspended tags thrown over the guard 495, the bags pass around the sprockets 233 and immediately after passing off these sprockets onto the rails 271, the shaft 198 of the gripper units are rotated through a final quarter revolution by a pin 497 which is fixed on the bar 273 so that it underlies this bar in the path of one of the diagonal slots 219 in the respective Geneva plate 218. Such rotation of the shaft 198 brings the travelling grippers into a position where their open sides are directed downwardly, and the grippers are then ready to release the finished bags. Opening of the grippers to release the finished bags is effected by a cam 498 which is fixed to a part of the relatively stationary frame 18 in the line of travel of the tail pieces 210 and 211 of the travelling grippers, the ends of this cam being tapered or bevelled as shown in Fig. 4 so that as the tail pieces of the travelling grippers enters this cam the respective grippers will be opened, thus freeing the finished bag which may drop from the gripper by gravity. Any suitable means may be employed for conveying the finished bags from the machine, an endless travelling conveyer 499 being shown in the present instance which is arranged beneath the point where the grippers open, one end of this conveyer passing over a pulley 500 which is suitably mounted in the top of the bed 1 and the other end of this conveyer passes over a roller 501 which may be mounted on a table-like extension 502 arranged beyond the delivery end of the machine. A chute 503 may be arranged beneath the travelling grippers to receive the tags delivered therefrom and to direct them properly on to the conveyer. The conveyer may be driven from the shaft 258 of the machine by a chain 504 which passes over a sprocket 505 on said shaft and engages a sprocket 506 on a shaft 507, and the latter shaft may be provided with a sprocket 508 which drives a chain 509, the latter engaging a sprocket 510 which is fixed on the shaft 511 of the conveyer 499. The finished bags with the tags attached thereto, as shown in Fig. 65, may be discharged or removed from the conveyer 499 for packing.

The machine may be driven by power from any suitable source. In the present instance the machine is driven by an electric motor 512 which is mounted on the bed 1, the shaft 513 of the motor being coupled, through suitable reduction gearing 514 to a sprocket 515, said sprocket being connected by a chain 516 to a sprocket 517 which is fixed on the shaft 244.

In order to remove from the travelling grippers after they have opened any bag which might fail to drop therefrom, due to entanglement of the sewing or tag attaching thread with the tail pieces of the grippers, or from other causes, a device is preferably arranged beneath the path of travel of the grippers beyond the bag delivery point thereof, this device being operative to remove from the grippers any bag that may remain attached thereto and at the same time to close the grippers so as to release the sewing or tag attaching thread should the same be caught between the tail pieces of the grippers.

This device is shown in Figs. 55, 56 and 57. It comprises a pair of ribbed or gear like rollers 518 and 519 which mesh with one another in the vertical plane in which the grippers travel, they being located directly below the line of travel of the grippers. The roller 518 is fixed on a shaft 520 which is journalled in the relatively stationary portions 521 of a bracket 522, the latter being bolted or otherwise secured to the top of the table 1, and the shaft 520 has a gear 523 fixed thereon and arranged to mesh with a gear 524 which is revolubly mounted on a shaft 525 supported by the bracket 522, the gear 524 meshing with the pinion 243 on the shaft 244, so that during operation of the machine, the continuously revolving shaft 244 will drive the roller 518 continuosly in a clockwise direction, Fig. 55. The roller 519 is driven from the roller 518, due to its meshing engagement therewith, but the shaft 526 which carries the roller 519 is mounted in the arms 527 of a fork 528, the latter being mounted on a shaft 529 which is supported on the bracket 522 so that the arms 527 may be rocked relatively to the bracket and thus allow the roller 519 to move toward or from the roller 518, incident to the passage of a bag downwardly between these rollers. The roller 519 is pressed yieldingly toward the roller 518 by a spring 530 one end of which bears on an arm 531 which is integral with or attached to the fork 528, the other end of the spring bearing against an adjusting nut 532 which is threaded on a stud 533 which is secured to the bracket 522. The continuous rotation of the rollers 518 and 519 will cause any bag adhering to a travelling gripper while the latter is passing over these rollers to be nipped by these rollers and drawn downwardly beneath them, the bag being thus pulled from the gripper.

The removal of any bag adhering to a gripper by the rollers 518 and 519 is preferably effected while the grippers are held in an approximately closed position so that the tail pieces 210 and 211 of the grippers will be relatively separated to release the sewing or tag attaching thread should the same be caught between these tail pieces. This closing motion of the grippers is effected by a pair of relatively fixed cam plates 534 and 535, these cam plates being arranged at opposite sides of the path of travel of the grippers after they leave the bag delivery point and the inner sides of these cam plates are provided with converging or inclined surfaces 536 and 537 which are arranged to engage the downwardly directed free ends of the open grippers 202 and 205 and to swing the grippers into substantially closed position as the gripper passes between these cam plates. The cam plate 534 is fixed at 538 to a relatively stationary part of the bracket 522, but the cam plate 535 is attached at 539 to the top of one of the swinging arms 527. By this arrangement, should the rollers 518 and 519 nip a bag hanging from one of the gripper units as the grippers thereof pass above these rollers, such bag will be positively withdrawn from the grippers due to the pull of the rollers 518 and 519 on the bag, aided by the closing motion imparted to the grippers by the cam plates, but complete closing of the grippers does not take place if a bag is present, as the passage of such bag between the rollers 518 and 519 will spread these rollers and in consequence the cam plates 534 and 535, as indicated by the dotted lines in Fig. 55 and hence the grippers will remain open sufficiently to avoid gripping the bag, although the tail pieces of the grippers will be held separated to release the sewing or tag attaching thread should the same be caught between them.

The complete general operation of the machine as hereinbefore described is as follows:—

The shaft 244 is driven continuously during the operation of the machine by the running of the motor 512, and all motion for the operation of the various mechanisms of the machine is taken from said shaft. The travelling grippers travel continuously in an endless path over the sprockets 233 and 234 at the ends of the machine, these sprockets being driven continuously from the shaft 244, through the medium of the worms and worm wheels previously described, the grippers being advanced along the upper and lower screws by the continuous rotation of these screws imparted thereto from the shaft 246 and the intermediate gearing previously described. The sewing machines are driven continuously from the shaft 244, the severing devices are driven continuously from the shaft 319, the tag feeding mechanism is driven continuously from the shaft 444, the tag-positioning gripper mechanism is driven continuously through the gear which connects it with the shaft 444, the tea-feeding and weighing mechanism is operated from the shaft 28 which in turn is driven from the shaft 37, and the cam 36 on the shaft 37 actuates the devices which introduce the weighed charges of tea into the fabric strip.

As the longitudinally folded fabric strip $x$ passes beneath and at the opposite sides of the filling or charge introducing pocket 16, a weighed charge of tea is introduced therein from the feeding and weighing mechanism the construction and method of operation of which has been hereinbefore described, and as each gripper unit commences its travel along the upper conveyer screw 229, it closes upon the folded strip at points in advance and behind the charge of tea therein. While the fabric strip is thus gripped by the gripper units it is caused to advance thereby and it is carried through the stitching mechanism of the first sewing machine 280 which forms the stitch $x'$ which closes the upper open edge of the strip by stitching together the free upper longitudinal edges thereof. While the strip in process of being sewed is advancing continuously, the knives 300 and 301 operate upon the travelling strip at points midway between adjacent gripper units and sever the strip into bag sections each containing a charge of tea and held by a gripper unit. These operations are shown diagrammatically in Fig. 64. As the gripper units continue their advance along the upper conveyer screw, they are successively rotated through a quarter revolution, as illustrated diagrammatically near the right hand end of Fig. 64$^a$, thus bringing the bag sections carried by the gripper units into position to bring an end or severed edge of the bag section into uppermost position where it will enter the stitching mechanism of the second sewing machine 328. This sewing machine forms the stitch $x^2$ which closes that end of the bag section, and as the advance of the bag section continues, the thread used in forming the stitching $x^2$ and which bridges adjacent bag sections is severed by the revolving cutter or knife 346 and the remaining ends of the threads are trimmed close to the corners of the bag sections by the revolving blades 357 and 358 in cooperation with the knife 349 (see Fig. 64$^a$).

The further advance of the gripper units causes the grippers thereof to rotate successively through two quarter revolutions, thus bringing the other end or severed edge of the bag section in uppermost position and in line with the stitching mechanism of the third sewing machine 363. During this portion of the travel of the gripper units along the upper conveyer screw 229, it is traversing the section $c$ of the screw (Fig. 5) which is of increased pitch with respect to the other sections $a$ and $b$ of this screw, the effect of this increased pitch being to increase the spacing between the traveling bag sections, as is indicated toward the left hand end of Fig. 64ª. While the bag sections are traveling in this position, their uppermost edges pass through the stitching mechanism of the third sewing mechanism 363 and they are stitched at $x^3$, and immediately following the passage of a bag through the stitching mechanism of this sewing machine, a tag T is carried through the stitching mechanism of this sewing machine by the tag grippers 471 so that the continuation of the stitching $x^3$ will cause the tag T to be stitched across its uppermost edge or corner, and the stitching continues to form the stitching $x^3$ of the next following bag. After the stitching of the next following bag has commenced, the revolving knife or gear 492 operates to sever the thread between a tag and the bag immediately in advance of it leaving the tag attached by a relatively long thread to the following bag. After the gripper units have passed around the sprocket 233, they receive a final quarter revolution which arranges the grippers in a downwardly opening position, and the grippers are then opened to release the finished bags and to allow them to drop by gravity on to the delivery means. The empty gripper units after travelling the length of the lower screw 231 and around the sprocket 234 return to the entrance end of the upper screw 239 and the operations hereinbefore described are repeated.

The engagement of the folded strip by the grippers at opposite sides of the charges introduced therein and the maintained engagement of the grippers at opposite sides of the charges in the bag sections, throughout the performance of the various operations upon the bag sections confines the charges within the bag sections in a manner which prevents leakage of the tea. As all of the operations are performed while the bag making strip or the bag section cut therefrom are being advanced continuously, the machine is capable of operating rapidly.

I claim as my invention:—

1. The method of packaging tea and other materials which comprises advancing a longitudinally folded strip of bag making material, depositing charges of material between the folded sides of said strip at intervals in its length, confining said charges to the areas of the strip onto which they are deposited, sewing together the longitudinal free edges of the strip, severing the strip into bag sections, and sewing successively the transverse severed edges of each bag section.

2. A packaging machine of the class described comprising means for forming the material to be packaged into charges, means for advancing a strip of bag making material to receive such charges successively, means for closing said strip longitudinally, means for severing said strip into bag sections, means for gripping the bag sections to advance them and to bring them into different positions during their advance, and means operative on the bag sections as thus positioned to close the severed edges thereof.

3. A packaging machine of the class described comprising means for forming the material to be packaged into charges, means for advancing a transversely doubled strip of bag making material while in a position to receive said charges successively, means for sewing together the free edges of said strip, means for severing said strip into bag sections, grippers operative to engage the respective bag sections to advance them and to bring them into different positions during their advance, and means for sewing the edges of the bag sections thus brought into position.

4. A packaging machine of the class described comprising means for forming the material to be packaged into predetermined charges, means for advancing a transversely doubled strip of bag making material past a position to receive said charges successively, means for sewing the longitudinal free edges of said strip, means for severing said strip into bag sections, grippers operative to engage the bag sections and rotatable to bring the opposite severed edges thereof successively into a predetermined position, and means for sewing said edges of the bag sections.

5. A packaging machine of the class described comprising weighing mechanism for weighing and delivering charges of the material to be packaged, means for advancing a strip of bag making material past a position to receive the weighed charges successively, means for sewing said strip longitudinally during its advance, means for severing said strip transversely to form bag sections, travelling grippers operative to engage the severed bag sections to advance them and each rotatable on an axis transverse to the direction of advance to bring the several edges to the respective bag section successively into a predetermined position, and means for sewing the severed edges of each bag section when brought into said position.

6. A packaging machine of the class described comprising means for forming the material to be packaged into charges, means for advancing a strip of bag making material past a position to receive said charges, means for uniting the longitudinal edges of the strip, means for severing the strip transversely to form bag sections, means for uniting the transverse severed edges of each bag section, and means for feeding tags to be attached to the respective bags.

7. A packaging machine of the class described comprising means for forming the material to be packaged into charges, means for advancing a strip of bag making material while in a position to receive said charges successively, means for sewing together the opposite longitudinal edges of the strip, means for severing the strip transversely to form bag sections, means for sewing the severed edges of each bag section, and means for feeding tags and for positioning them to be stitched by a continuation of the sewing beyond one of the transverse edges of the respective bag sections.

8. In a packaging machine of the class described, the combination of a pocket to receive exteriorly thereof a strip of bag making material in transversely folded form which is open at a longitudinal edge thereof, means for introducing a charge of material into said pocket through said open longitudinal edge of the strip, and a plunger operative in said pocket to transfer the charge therefrom to the strip.

9. In a packaging machine of the class described, the combination of a receptacle adapted to fit into and to hold a strip of bag making material in transversely folded form, means for introducing a charge of material into said receptacle, a plunger operative longitudinally within said receptacle to transfer a charge therefrom to said strip, and means operative concurrently with said plunger and exteriorly of said strip to advance it.

10. In a packaging machine of the class described, the combination of a pocket for guiding a transversely folded bag making strip for longitudinal movement, means for depositing a charge of material into said pocket, a gate movable transversely across an end of said pocket to open and close it, and a plunger movable longitudinally in rear of the deposited charge and operative to transfer the charge from said pocket to said strip while the gate is open.

11. In a packaging machine of the class described, the combination of means for guiding a bag making strip folded into trough-like form for longitudinal movement, means for depositing a charge of material within said strip, grippers arranged to engage the strip between them and operative to advance the strip, and members operative to clamp together the sides of the strip in advance of the grippers and behind a charge therein and to advance with the strip until the latter is engaged by the grippers.

12. In a packaging machine, the combination of means for guiding a transversely folded bag making strip for longitudinal movement, means for depositing a charge of material therein, grippers operative to engage the sides of the strip in advance and in rear of the charge therein and to advance the strip longitudinally, and means for positively forcing said grippers into clamping engagement with the sides of the strip.

13. In a packaging machine, the combination of a pocket beneath which a bag making strip in transversely folded form is movable longitudinally, means for depositing a charge of material into said pocket, a packing member movable into said pocket to pack the charge therein, a feeding member operative in said pocket beneath said packing member to transfer the charge from said pocket to said strip, and a gate movable into position behind the charge after the transfer of the latter to said strip.

14. In a packaging machine, the combination of means for advancing a strip of bag making material longitudinally, means for depositing predetermined separate charges of material on said strip at intervals in its length, means for uniting the longitudinal edges of the strip, and means for severing said strip at points between the charges during the advance of the strip to form bag sections each containing a charge.

15. In a packaging machine, the combination of means for advancing a transversely folded strip of bag making material, means for introducing charges of material into said strip at longitudinal intervals, means for uniting the longitudinal edges of the strip, and severing means mounted to advance in unison with the strip and operative during its advance to sever the strip at points between the charges therein.

16. In a packaging machine of the class described, the combination of means for advancing a series of bag sections, a sewing machine operating to sew an edge of each bag section while it is being advanced by said advancing means, and a tucker operative to introduce the forward end of the edge of each bag section to be sewed into the sewing machine.

17. In a packaging machine of the class described, the combination of means for sewing the edges of a series of bags, and means for severing the sewing threads between adjacent bags of the series embodying a stationary knife member adjacent to the path of said threads and a cooperative knife member operative to carry the threads into severing engagement with said stationary member.

18. In a packaging machine of the class described, the combination of means for sewing the edges of a series of bags, means for severing the sewing threads between adjacent bags of the series, and means for trimming and removing the resulting thread ends.

19. In a machine of the class described, the combination of means for advancing bag sections, means for positioning tags between adjacent bag sections, and means operative successively on the bags and the tags for attaching the tags to the bags in spaced relation therewith.

20. In a machine of the class described, the combination of means for advancing bag sections, means for sewing the bag sections, and means for positioning tags to be sewed by the bag sewing means.

21. In a machine of the class described, the combination of means for advancing bag sections, means for feeding tags therefor, grippers arranged to receive the tags from said feeding means and operative to advance them in the direction of advance of the bag sections, and means operative successively on the tags while held by said grippers and on the bag sections for attaching the tags to the respective bag sections.

22. In a machine of the class described, the combination of means for advancing bag sections, means for feeding tags therefor, grippers arranged to receive the tags from the feeding means and operative to advance them concurrently with the advance of the bag sections, and sewing means arranged to receive and to act alternately on the bag sections and tags during their advance.

23. In a machine of the class described, the combination of sewing mechanism, means for advancing bag sections thereto to be sewed, means for advancing tags to the sewing mechanism to be sewed and attached by the sewing thread to adjacent bag sections, and means for severing the sewing thread between each tag and one of the bag sections adjacent to it.

24. In a machine of the class described, the combination of means for advancing bag sections, tag feeding means includng a reciprocatory tag delivery member, tag positioning means operative to receive tags successively from said delivery member, and means for attaching tags held by said positioning means to the respective bag sections.

25. In a machine of the class described, the combination of means for advancing bag sections, sewing means operative successively on the bag sections during their advance, tag feeding means including a reciprocatory tag delivery member, and a rotatable member carrying grippers operative to receive tags from said delivery member and to advance them to the sewing means to be stitched thereby and thus attached to the respective bag sections.

26. In a machine of the class described, the combination of means for supplying a strip of bag forming material, means for supplying charges of material to the strip, means for severing the strip into bag sections, means for closing the free edges of the bag sections, travelling gripper units operative to advance the strip and the bag sections, and means for imparting travelling movement to the gripper units embodying a revoluble screw arranged longitudinally of the direction of travel of the gripper units and engaged therewith.

27. In a machine of the class described, the combination of means for supplying a strip of bag making material, means for supplying charges of material to said strip at intervals in its length, means for severing said strip at points between said charges, means for closing the free edges of the bag sections, individual gripper units guided to travel in a path to advance the strip and the bag sections cut therefrom, and a revoluble screw extending parallel to the path of travel of the gripper units and cooperative therewith to advance them, the portion of said screw which cooperates with the gripper unit which has passed the point where the strip is severed having an increased pitch to accelerate the speed of travel of such unit and thereby separate it from the next following gripper unit.

28. In a machine of the class described, the combination of means for supplying a strip of bag making material, means for supplying charges of material successively thereto, means for severing the strip at points between the charges to form bag sections, gripper units each embodying grippers rotatable on an axis transverse to the length of the strip, and operative to grip the strip and the bag sections cut therefrom and to rotate the bag sections into different positions, guides along which said gripper units are arranged to travel, means located at predetermined points along said guides and operative on the gripper units to rotate the grippers and the bag section thereon into different predetermined positions, and means for advancing the gripper units along said guides.

29. In a machine of the class described, the combination of travelling gripper units for advancing bag sections, sewing means to operate on said bag sections during their advance, means for positioning tags for operation thereon by said sewing means, and means for advancing the gripper units and for accelerating their speed of travel prior to the operation of the sewing means thereon to increase the space between the successive bag sections to accommodate the tags between them.

30. In a machine of the class described, the combination of a series of travelling gripper units each embodying grippers adapted to hold bag sections when closed, means for opening the grippers to deliver the bag sections therefrom, and a device for removing from the grippers any bag section which may fail to be delivered therefrom.

In testimony whereof I have hereunto set my hand.

JOHN T. DALTON.